US008842725B2

(12) United States Patent
Chupp et al.

(10) Patent No.: US 8,842,725 B2
(45) Date of Patent: Sep. 23, 2014

(54) MARK-BASED CONTENT MODULATION AND DETECTION

(75) Inventors: Christopher E. Chupp, St. Louis, MO (US); Michael S. Gramelspacher, Fairview Heights, IL (US); Gary A. Lorden, Pasadena, CA (US)

(73) Assignee: Koplar Interactive Systems International L.L.C., St. Louis, MO (US)

( * ) Notice: Subject to any disclaimer, the term of this patent is extended or adjusted under 35 U.S.C. 154(b) by 529 days.

(21) Appl. No.: 12/648,006

(22) Filed: Dec. 28, 2009

(65) Prior Publication Data

US 2010/0166083 A1   Jul. 1, 2010

Related U.S. Application Data

(63) Continuation of application No. 11/152,636, filed on Jun. 14, 2005, now Pat. No. 7,664,175.

(60) Provisional application No. 60/580,278, filed on Jun. 16, 2004, provisional application No. 60/583,465, filed on Jun. 27, 2004, provisional application No. 60/647,047, filed on Jan. 26, 2005, provisional application No. 60/663,010, filed on Mar. 18, 2005.

(51) Int. Cl.
| | | |
|---|---|---|
| *H04N 7/12* | (2006.01) | |
| *H04N 21/432* | (2011.01) | |
| *H04N 7/025* | (2006.01) | |
| *H04N 7/173* | (2011.01) | |
| *H04N 21/44* | (2011.01) | |
| *H04N 21/8355* | (2011.01) | |
| *H04N 21/4627* | (2011.01) | |
| *H04N 21/8358* | (2011.01) | |
| *H04N 21/433* | (2011.01) | |
| *H04N 7/08* | (2006.01) | |

(52) U.S. Cl.
CPC ............ *H04N 7/025* (2013.01); *H04N 21/4325* (2013.01); *H04N 7/17318* (2013.01); *H04N 21/44008* (2013.01); *H04N 21/8355* (2013.01); *H04N 21/4627* (2013.01); *H04N 21/8358* (2013.01); *H04N 21/4334* (2013.01); *H04N 7/08* (2013.01)
USPC ..................................................... 375/240.01

(58) Field of Classification Search
USPC .................. 375/240, 240.01, 240.03, 240.04, 375/240.05, 240.12, 240.13, 240.14; 386/94, 233, 252; 704/500
See application file for complete search history.

(56) References Cited

U.S. PATENT DOCUMENTS

| 3,743,768 A | 7/1973 | Copland |
| 4,454,507 A | 6/1984 | Srinivasan et al. |

(Continued)

FOREIGN PATENT DOCUMENTS

WO   2005020560 A2   3/2005

OTHER PUBLICATIONS

Interview Summary for U.S. Appl. No. 11/152,636 dated Aug. 5, 2009, 1 page.

(Continued)

*Primary Examiner* — Allen Wong
(74) *Attorney, Agent, or Firm* — Christopher R. Carroll; The Small Patent Law Group LLC

(57) ABSTRACT

A method for modulating mark (20) within content signal (18) that has frames, where each of the frames has content lines and one or more measurable parameters, where each of the content lines has pixels, and where each of the pixels has a value, the method comprising selecting framesets from among the frames of the content signal; modulating at least two of the framesets; and causing mark (20) to be present within content signal (18) by at least modulating at least two of the framesets.

15 Claims, 35 Drawing Sheets

(56) References Cited

U.S. PATENT DOCUMENTS

| | | | |
|---|---|---|---|
| 4,504,852 A | 3/1985 | Ducret | |
| 4,689,673 A | 8/1987 | Ohki et al. | |
| 4,694,357 A | 9/1987 | Rahman et al. | |
| 4,807,031 A | 2/1989 | Broughton et al. | |
| 4,914,694 A | 4/1990 | Leonard et al. | |
| 4,969,041 A | 11/1990 | O'Grady et al. | |
| 5,099,322 A | 3/1992 | Gove | |
| 5,200,822 A | 4/1993 | Bronfin et al. | |
| 5,243,423 A | 9/1993 | DeJean et al. | |
| 5,333,091 A | 7/1994 | Iggulden et al. | |
| 5,565,998 A * | 10/1996 | Coombs et al. | 386/233 |
| 5,594,493 A | 1/1997 | Nemirofsky | |
| 5,691,828 A | 11/1997 | Weiss et al. | |
| 5,699,174 A | 12/1997 | Weiss et al. | |
| 5,717,697 A | 2/1998 | Yin | |
| 5,742,743 A | 4/1998 | Weiss | |
| 5,745,596 A | 4/1998 | Jefferson | |
| 5,745,604 A | 4/1998 | Rhoads | |
| 5,751,358 A * | 5/1998 | Suzuki et al. | 375/240.04 |
| 5,768,426 A | 6/1998 | Rhoads | |
| 5,781,237 A * | 7/1998 | Fukuda | 375/240.04 |
| 5,815,217 A | 9/1998 | Kumazawa et al. | |
| 5,844,607 A | 12/1998 | Gebler et al. | |
| 5,850,481 A | 12/1998 | Rhoads | |
| 5,852,429 A | 12/1998 | Scheffer et al. | |
| 5,960,081 A | 9/1999 | Vynne et al. | |
| 5,999,688 A | 12/1999 | Iggulden et al. | |
| 6,044,182 A | 3/2000 | Daly et al. | |
| 6,045,515 A | 4/2000 | Lawton | |
| 6,061,094 A | 5/2000 | Maietta | |
| 6,094,228 A | 7/2000 | Ciardullo et al. | |
| 6,122,392 A | 9/2000 | Rhoads | |
| 6,229,572 B1 | 5/2001 | Ciardullo et al. | |
| 6,232,955 B1 | 5/2001 | Guttag et al. | |
| 6,266,430 B1 | 7/2001 | Rhoads | |
| 6,282,654 B1 | 8/2001 | Ikeda et al. | |
| 6,347,114 B1 | 2/2002 | Blanchard | |
| 6,351,493 B1 | 2/2002 | Reed et al. | |
| 6,370,272 B1 | 4/2002 | Shimizu | |
| 6,400,827 B1 | 6/2002 | Rhoads | |
| 6,404,898 B1 | 6/2002 | Rhoads | |
| 6,421,497 B1 | 7/2002 | Quan | |
| 6,449,379 B1 | 9/2002 | Rhoads | |
| 6,512,835 B1 | 1/2003 | Numao et al. | |
| 6,539,055 B1 | 3/2003 | Hazra | |
| 6,549,669 B1 | 4/2003 | Sundqvist et al. | |
| 6,571,220 B1 | 5/2003 | Ogino et al. | |
| 6,600,873 B1 | 7/2003 | Brill et al. | |
| 6,647,129 B2 | 11/2003 | Rhoads | |
| 6,661,905 B1 | 12/2003 | Chupp et al. | |
| 6,674,876 B1 | 1/2004 | Hannigan et al. | |
| 6,701,062 B1 | 3/2004 | Talstra et al. | |
| 6,731,684 B1 | 5/2004 | Wu | |
| 6,748,114 B1 | 6/2004 | Ishikawa | |
| 6,751,398 B2 | 6/2004 | Agnihotri et al. | |
| 6,766,098 B1 | 7/2004 | McGee et al. | |
| 6,778,682 B2 | 8/2004 | Rhoads | |
| 6,778,757 B1 * | 8/2004 | Kawamae et al. | 386/252 |
| 6,826,352 B1 | 11/2004 | Quan | |
| 6,836,549 B1 | 12/2004 | Quan et al. | |
| 6,842,160 B2 | 1/2005 | Yamazaki et al. | |
| 6,845,213 B2 | 1/2005 | Maas et al. | |
| 6,975,746 B2 | 12/2005 | Davis et al. | |
| 6,987,862 B2 | 1/2006 | Rhoads | |
| 6,992,726 B2 | 1/2006 | Chupp et al. | |
| 7,092,441 B1 * | 8/2006 | Hui et al. | 375/240.03 |
| 7,116,374 B2 | 10/2006 | Chupp et al. | |
| 7,167,209 B2 | 1/2007 | Cookson et al. | |
| 7,286,188 B2 | 10/2007 | Chupp et al. | |
| 7,586,541 B2 | 9/2009 | Chupp et al. | |
| 7,664,175 B1 | 2/2010 | Chupp et al. | |
| 7,692,723 B2 | 4/2010 | Chupp et al. | |
| 7,856,054 B1 * | 12/2010 | Kasarabada et al. | 375/240.03 |
| 2001/0012324 A1 * | 8/2001 | Normile | 375/240.05 |
| 2002/0089473 A1 | 7/2002 | Yamazaki et al. | |
| 2002/0183102 A1 | 12/2002 | Withers et al. | |
| 2004/0186735 A1 * | 9/2004 | Ferris et al. | 704/500 |
| 2004/0240846 A1 * | 12/2004 | Cookson et al. | 386/94 |
| 2005/0024536 A1 | 2/2005 | Cookson et al. | |

OTHER PUBLICATIONS

Applicant Interview for U.S. Appl. No. 11/152,636 dated Aug. 7, 2009, 3 pages.

Non-Final Office Action for U.S. Appl. No. 11/152,636 dated Aug. 14, 2009, 7 pages.

Response to Non-Final Office Action for U.S. Appl. No. 11/152,636 dated Aug. 27, 2009, 10 pages.

Preliminary Amendment for U.S. Appl. No. 11/152,636 dated Oct. 31, 2007, 20 pages.

Amendment for U.S. Appl. No. 11/095,333 dated Mar. 31, 2005, 17 pages.

Amendment for U.S. Appl. No. 11/095,333 dated Nov. 10, 2005, 4 pages.

Response for U.S. Appl. No. 10/888,919 dated Mar. 31, 2005; 19 pages.

Non-Final Office Action for U.S. Appl. No. 10/888,919 dated Apr. 7, 2005, 9 pages.

Office Communication for U.S. Appl. No. 10/888,919 dated Apr. 27, 2005, 2 pages.

Response to Non-Final Office Action for U.S. Appl. No. 10/888,919 dated May 13, 2005; 17 pages.

Non-Final Office Action for U.S. Appl. No. 10/888,919 dated Aug. 11, 2005; 5 pages.

Examiners Interview Summary Examiners Interview Summary for U.S. Appl. No. 10/888,919 dated Aug. 31, 2005, 1 page.

Response to Non-Final Office Action for U.S. Appl. No. 10/888,919 dated Sep. 7, 2005; 15 pages.

Non-Final Office Action for U.S. Appl. No. 10/888,919 dated Dec. 1, 2005; 6 pages.

Response to Non-Final Office Action for U.S. Appl. No. 10/888,919 dated Feb. 24, 2006; 21 pages.

Office Communication for U.S. Appl. No. 10/888,919 dated Mar. 1, 2006; 3 pages.

Office Communication for U.S. Appl. No. 10/888,919 dated Aug. 26, 2006; 2 pages.

Non-Final Office Action for U.S. Appl. No. 11/465,234 dated May 1, 2007; 8 pages.

Response to Non-Final Office Action for U.S. Appl. No. 11/465,234 dated May 15, 2007; 13 pages.

International Search Report for PCT/US2004/027752 dated Apr. 18, 2005; 5 pages.

Written Opinion for PCT/US2004/027752 dated Apr. 18, 2005; 4 pages.

Coursey, "Why Microsoft caved in on copy protection", Oct. 9, 2002; 2 pages.

Non-Final Office Action for U.S. Appl. No. 11/095,334 dated Nov. 7, 2008; 7 pages.

Notice of Allowance for U.S. Appl. No. 11/848,044 dated Nov. 18, 2009; 4 pages.

Notice of Allowance for U.S. Appl. No. 11/095,334 dated May 13, 2009; 4 pages.

Notice of Allowance for U.S. Appl. No. 10/888,919 dated May 16, 2006; 7 pages.

Notice of Allowance for U.S. Appl. No. 11/465,234 dated May 31, 2007; 4 pages.

Notice of Allowance for U.S. Appl. No. 11/095,333 dated Jul. 29, 2005; 8 pages.

(56) References Cited

OTHER PUBLICATIONS

Notice of Allowance for U.S. Appl. No. 11/152,636 dated Sep. 29, 2009; 7 pages.

Non Final Office Action for U.S. Appl. No. 11/848,044 dated Jun. 9, 2009; 11 pages.

Preliminary Amendment for U.S. Appl. No. 11/095,334 dated Oct. 25, 2007; 8 pages.

Preliminary Amendment for U.S. Appl. No. 11/095,334 dated May 31, 2005; 17 pages.

Amendment and Response for U.S. Appl. No. 11/848,044 dated Aug. 7, 2009; 12 pages.

Notice of Allowance for U.S. Appl. No. 11/848,044 dated Jan. 4, 2010; 2 pages.

Amendment and Response for U.S. Appl. No. 11/095,334 dated Mar. 9, 2009; 11 pages.

* cited by examiner

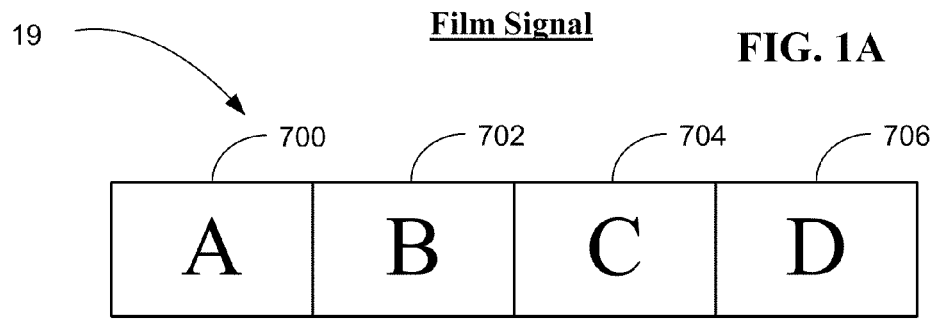
Film Signal   FIG. 1A
PRIOR ART
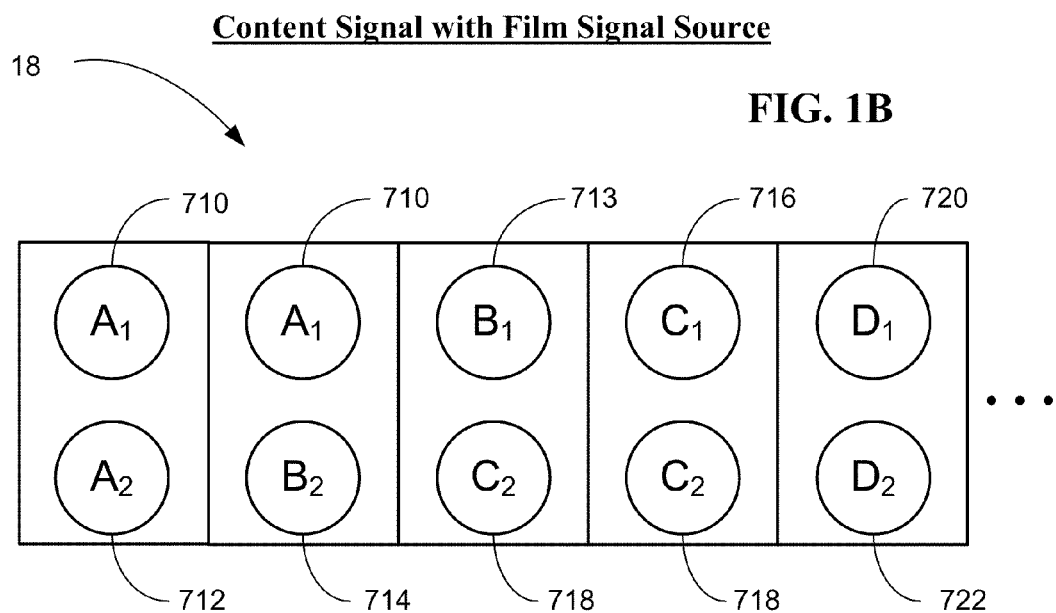
Content Signal with Film Signal Source   FIG. 1B
PRIOR ART

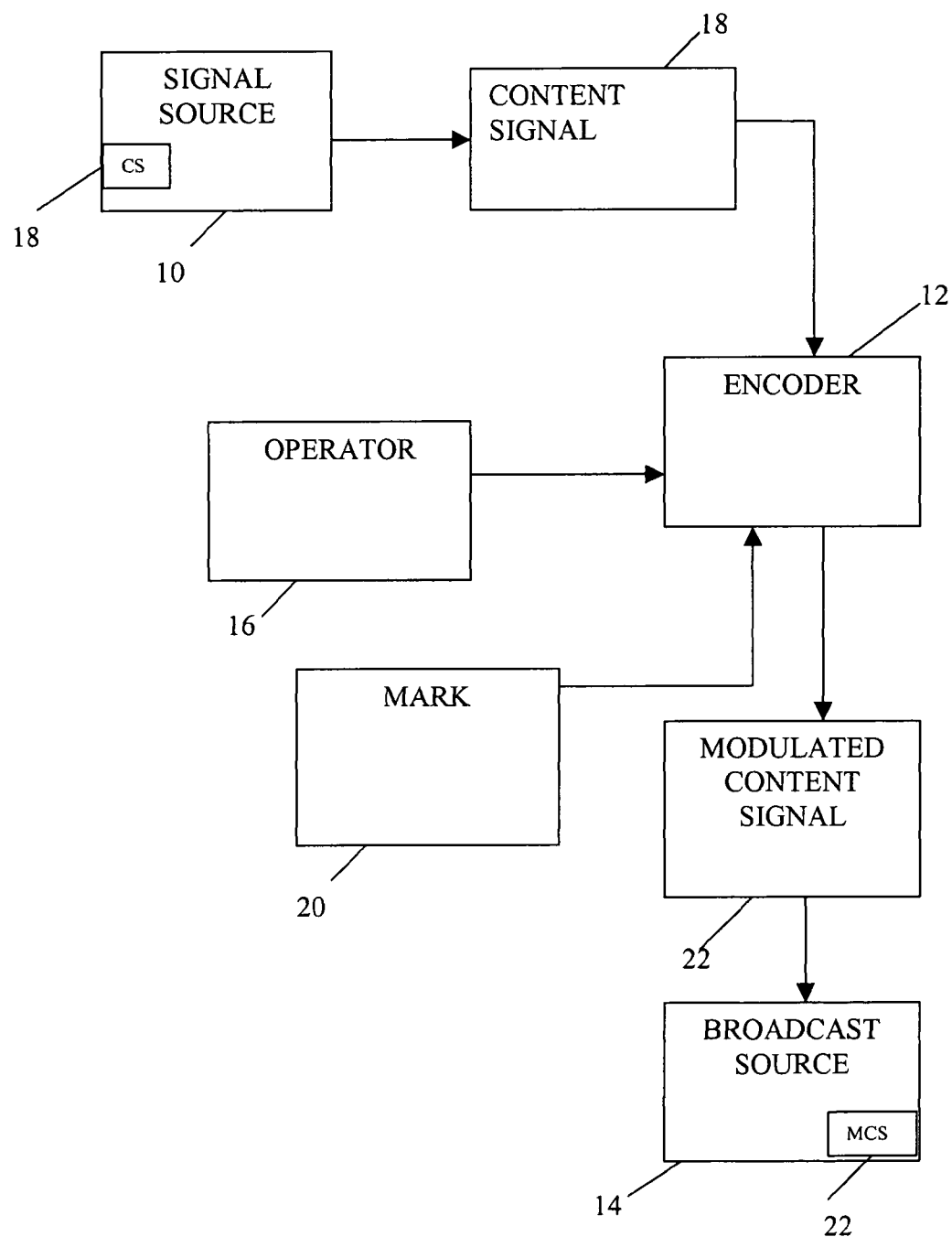
Encoding    FIG. 2

Encoder FIG. 4

Calculate the Change in a Measurable Parameter for a Field

Selection Frame Based Modulation with 3:2 Pulldown

Subtracting the Luminance Level Adjustment

Alternate Modulation Method

Detecting Method

Analyze the Detect Frame Parameters

FIG. 24

Positive Calculation Matrix

| RANGE | WEIGHTED MARK VALUE |
|---|---|
| 50,000 | -25 |
| 100,000 | 50 |
| 150,000 | 150 |
| Max Range | 300 |

FIG. 25

Negative Calculation Matrix

| RANGE | WEIGHTED MARK VALUE |
|---|---|
| -50,00 | -25 |
| -100,000 | 50 |
| -150,000 | 150 |
| Neg. Max Range | 300 |

Alternate Method of Calculating a Change in Measurable Parameter

Alternate Method of Calculating a Change in Measurable Parameter

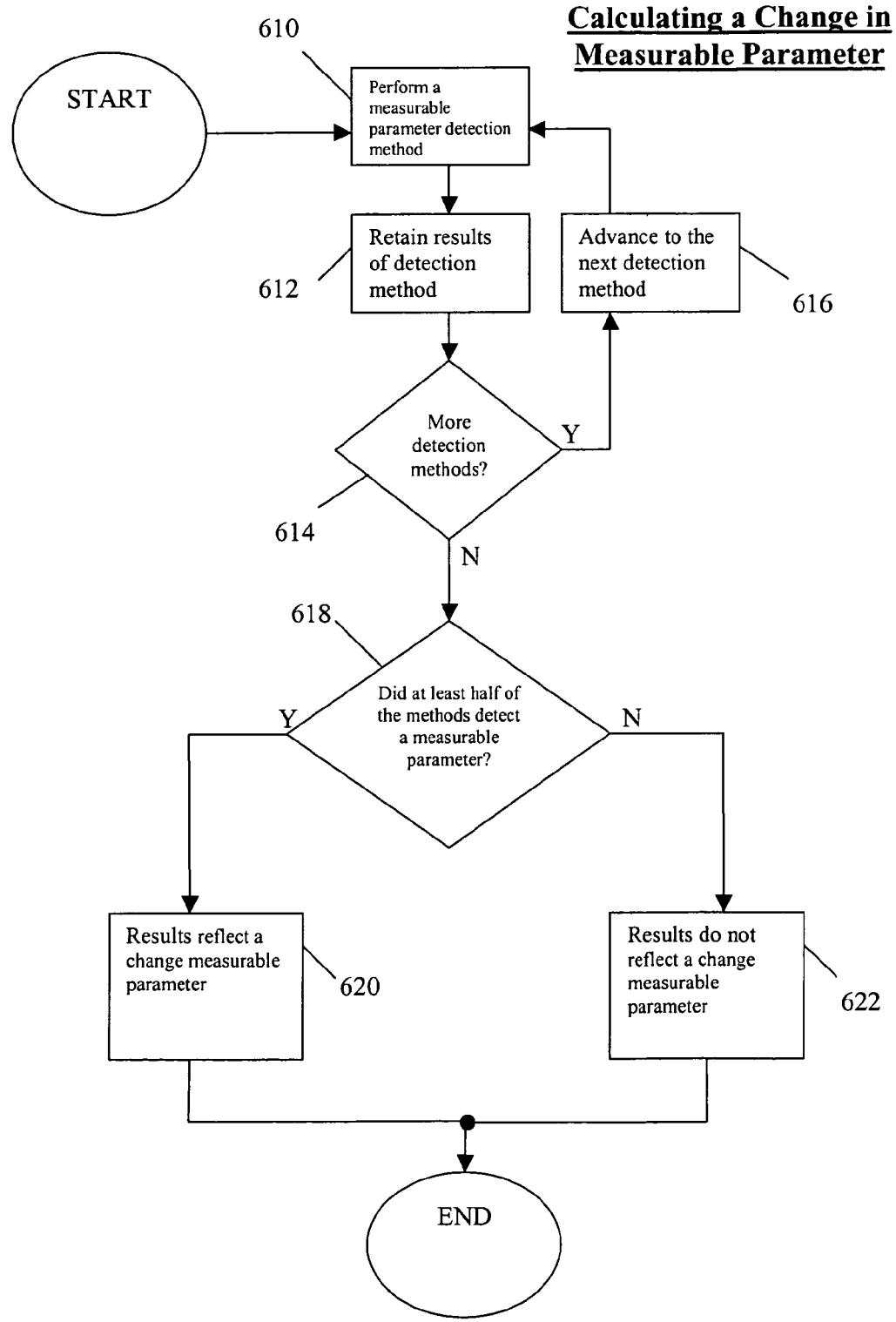

Playback Device  FIG. 33
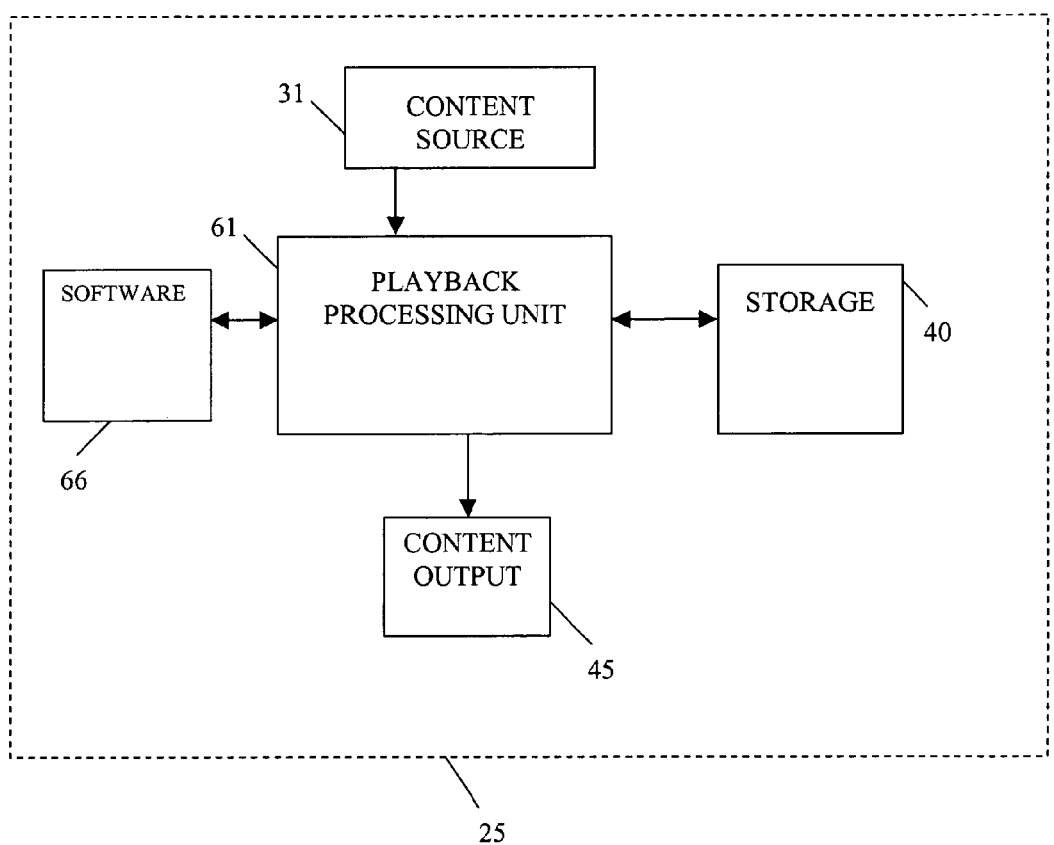

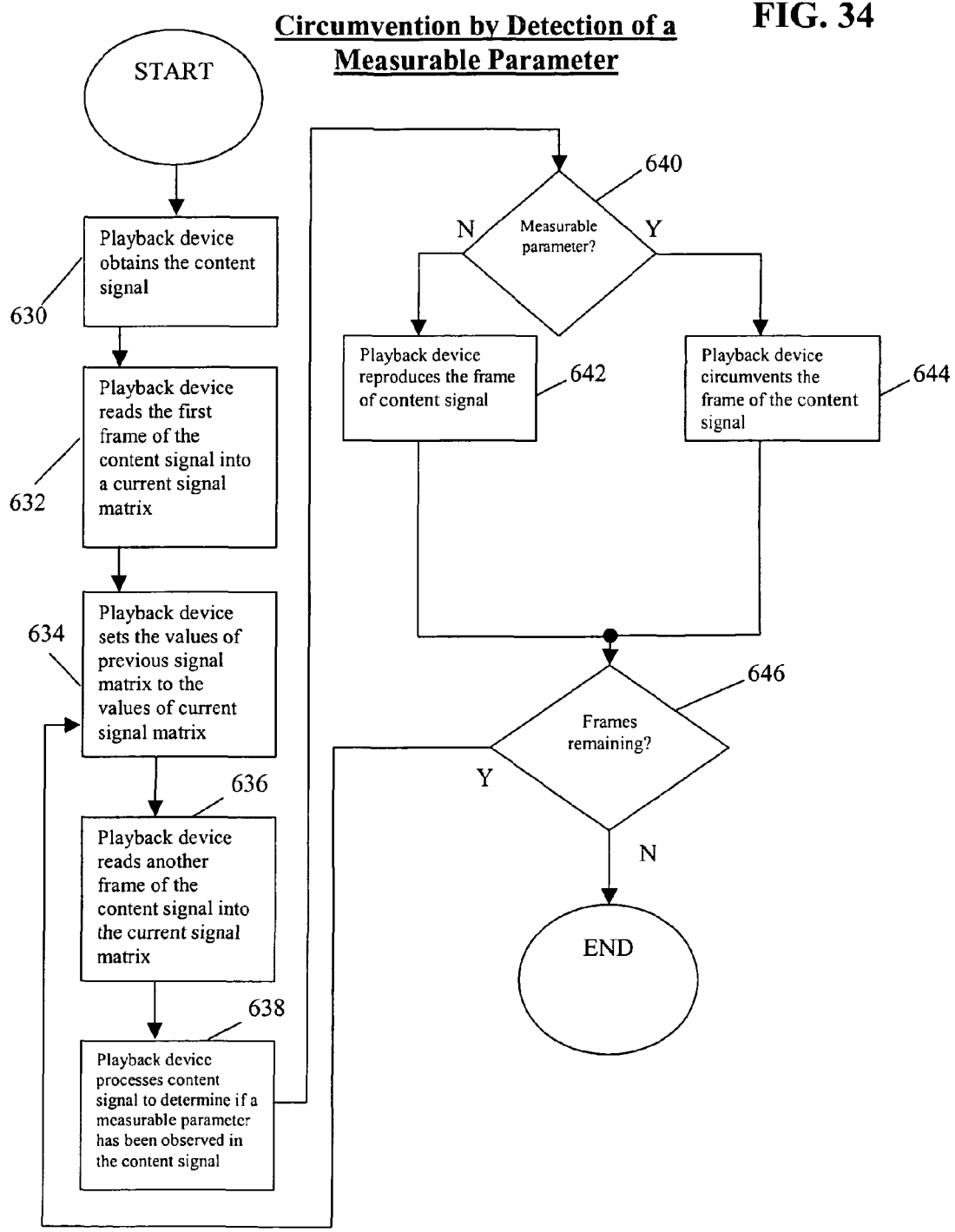

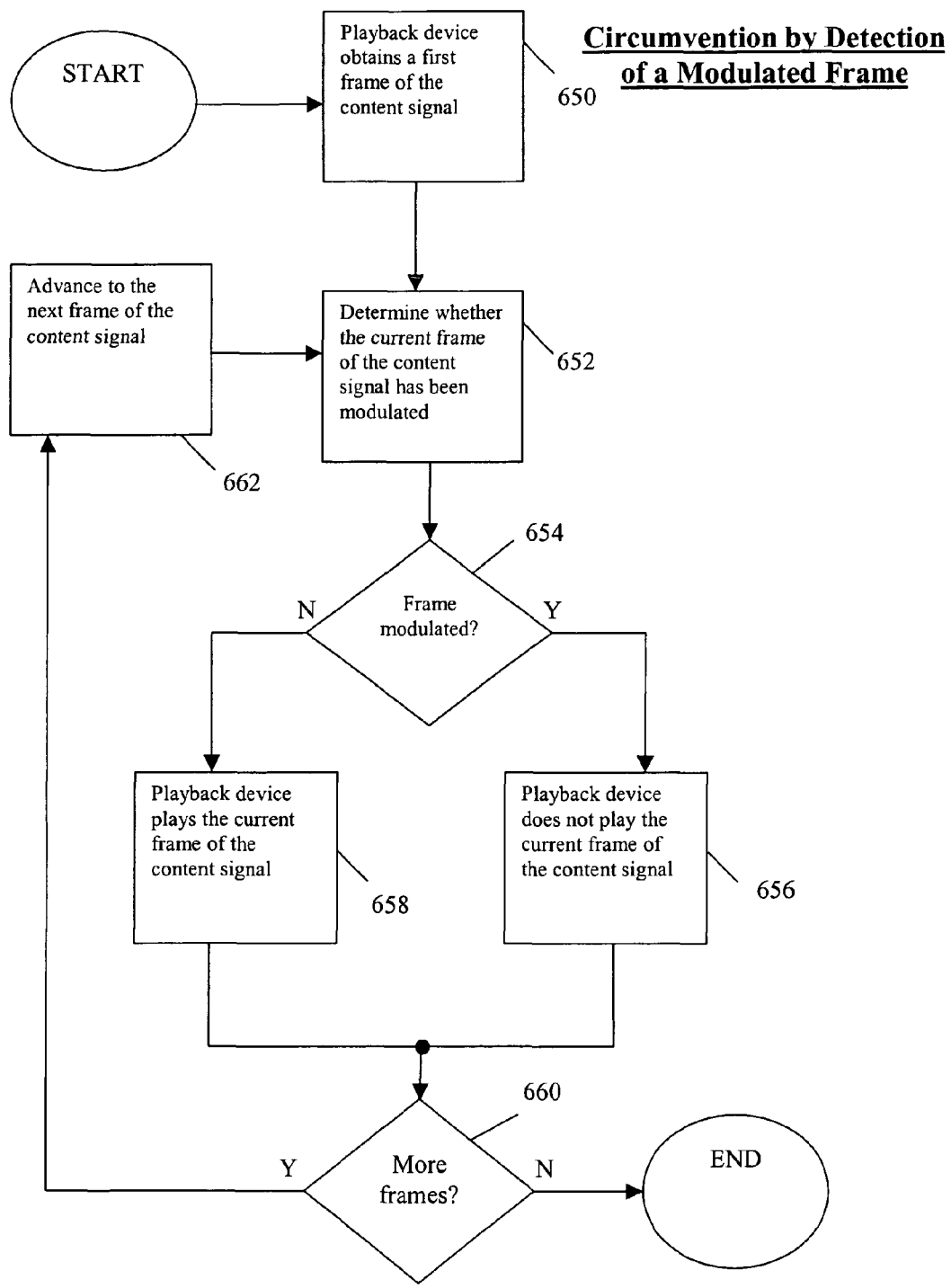

MARK-BASED CONTENT MODULATION AND DETECTION

CROSS-REFERENCE TO RELATED APPLICATIONS

This application is a continuation of U.S. patent application entitled "Mark-Based Content Modulation And Detection", Ser. No. 11/152,636, filed 14 Jun. 2005 which claims the benefit of U.S. Provisional patent applications entitled "Method and System for Predictive Encoding of Carrier Signals", Ser. No. 60/580,278, filed 16 Jun. 2004 by Michael S. Gramelspacher and Christopher E. Chupp; "System for Circumvention of Predictive Encoding of Carrier Signals", Ser. No. 60/583,465, filed 27 Jun. 2004 by Christopher E. Chupp; "Method and System for Mark-Based Encoding", Ser. No. 60/647,047, filed 26 Jan. 2005 by Michael S. Gramelspacher and Christopher E. Chupp; and "Method and System for Mark-Based Content Encoding and Detecting", Ser. No. 60/663,010, filed 18 Mar. 2005 by Christopher E. Chupp, Michael S. Gramelspacher and Gary A. Lorden, all of which are herein incorporated by reference in their entireties.

FIELD OF THE INVENTION

This document related to modulating and detecting a mark within a content signal for signaling purposes.

DESCRIPTION OF THE RELATED ART

Motion picture and television broadcast studios (the "studios") and their affiliates are in the business of producing, manufacturing and/or distributing copyrighted content including motion pictures and television shows. The studios, either directly or through their affiliates, distribute motion pictures and television shows via television transmission, theatrically, and on videocassette tapes and digital versatile discs ("DVDs").

The copyrighted content of the studios is subject to both authorized and unauthorized reproduction. In an effort to protect its copyrighted content, the studios have implemented a number of copy protection schemes to limit the type and amount of unauthorized reproduction. For example, content scramble system (CSS) was implemented to prevent digital copying of protected DVDs and Macrovision's technology was implemented to prevent unauthorized copying of copyrighted video tapes by use of a carefully timed sequence of protection pulses that upsets the video auto gain control and the horizontal synch.

The studios recently sought a suitable content protection system to protect copyrighted content that has been copied by taking the content in its current format (e.g., digital or analog video), playing it on a playback device through an analog output and capturing the analog signal in an analog or digital format so that the content can be reproduced without restriction. The potential for copying content via an analog output in an unrestricted manner is commonly referred to as the "analog hole".

Copy Generation Management System-Analog ("CGMS-A"), was adopted by the studios as a partial solution to the analog hole. CGMS-A inserts a transport carrying copyright information in the vertical blanking interval (VBI) of a video signal. The copyright information has four associated states: (1) a "copy never" state indicating that the content can never be copied, (2) a "copy once" state indicating that the content can be copied, but that the newly copied content cannot be further copied, (3) a "copy no more" state indicating that the content is a copy from content designated with a copy once state and can therefore no longer be copied, and (4) a "free to copy" state indicating that the content is not subject to copy restrictions. Since video signals predated CGMS-A, by default unencoded content is interpreted by a CGMS-A system as being in a "free to copy" state.

The studios recognized that CGMS-A was not a panacea to resolving the analog hole. In response, the studios launched, through the Copy Protection Technical Working Group, an analog reconversion discussion group with representation from the consumer and electronics industry to actively seek a solution to the analog hole.

SUMMARY OF THE INVENTION

In brief summary, in one aspect, a mark is modulated and detected within a content signal based on the detection of one or more measurable parameters within the content signal.

In one aspect, a mark is modulated within a content signal that has frames. Each of the frames has one or more measurable parameters and content lines. Each of the content lines has of pixels. And, each of the pixels has a value. Framesets are selected from among frames of the content signal. At least two of the selected framesets are modulated. As a consequence of at least the modulation, the mark becomes present within the content signal.

In another aspect, a mark is detected within a content signal that has frames. Each of the frames has one or more measurable parameters and content lines. Each of the content lines has pixels. And, each of the pixels has a value. The framesets are identified from among the frames of the content signal. The framesets are processed to determine if the mark is present within the content signal.

In another aspect, a mark is modulated within a content signal that has frames. Each of the frames has content lines. Each of the content lines has pixels. And, each of the pixels has a value. The framesets are identified among the frames of the content signal that when modulated remain imperceptible when the content signal is reproduced for normal viewing, at least two of the framesets are modulated. As a consequence, the mark is embedded within the content signal thereby creating a modulated content signal. The modulated content signal has a low visual perception of modulation even at a high amplitude modulation.

In another aspect, a mark is detected within a content signal that has frames. Each of the frames has one or more measurable parameters and content lines. Each of the content lines has pixels. And, each of the pixels has a value. At least a significant number of framesets are identified among the plurality of the frames that would have been selected by an encoder. The framesets are analyzed to determine if the mark is present within the content signal based on the significant number.

In another aspect, a frame is modulated. The frame has content lines. Each of the content lines has pixels. Each of the pixels has a value. A static pattern is defined or obtained. The frame is modulated based on the static pattern. The static pattern indicates whether a value adjustment when made during modulation should be added to or subtracted from the value for each of the plurality of pixels of the plurality of content lines.

In another aspect, a content signal that has frames is reproduced. The modulated frames are determined from the plurality of frames. The plurality of frames that are not the modulated frames are reproduced.

In another aspect, a frame is modulated or demodulated. The frame is selected to be modulated or demodulated by identifying a frame having attributes corresponding to a change in one or more measurable parameters as the frame to be modulated or demodulated. The frame that is selected is modulated or demodulated.

In an optional aspect, the content signal is obtained from a signal source. A determination is made as to whether each of the frames of the content signal have a first field and a second field. Each of the frames of the content signal are split into a first field and a second field if each of the frames of the content signal do not have the first field and the second field.

In an optional aspect, the framesets are selected. The existence of changes in the one or more measurable parameters within the frames are detected. A designated frame and a corresponding comparison frame are designated at each of the detected existence of changes in the one or more measurable parameters within the frames.

In an optional aspect, a CMP frame is selected as the designated frame. A previous frame is selected as the comparison frame.

In an optional aspect, a frameset is selected as one or more selected frames at a frame offset of zero or more frames from each of the CMP frames of the content signal.

In an optional aspect, each of the framesets is located at a frame offset of zero or more frames from each of the designated frames of the content signal.

In an optional aspect, the existence of isolated changes in the one or more measurable parameters within the frames is detected. An encoder and a detector designate substantially the same designated frames.

In an optional aspect, the operator instructions are obtained from an operator. A frame subset is selected from a subset of the frames. Each of the frame subsets has a plurality of subset frames. One or more frame subsets are analyzed by detecting the existence of changes in the one or more measurable parameters within the frames.

In an optional aspect, one or more frame subsets are analyzed. A first frame subset of the one or more frame subsets is obtained. Encode frame parameters are analyzed corresponding to the plurality of subset frames of the first frame subset or one or more subsequent frame subsets. A selection criteria is qualified for the first frame subset or the one or more subsequent frame subsets based on analysis of the encode frame parameters corresponding to frames. One or more subsequent frame subsets of the one or more frame subsets is obtained. Repeating until either there are no remaining one or more subsequent frame subsets among the one or more frame subsets or the operator instructions indicate completion.

In an optional aspect, analyzing encode frame parameters is defined. One or more measurable parameters of a first field and a second field for each of the plurality of subset frames is calculated or obtained.

In an optional aspect, one or more measurable parameters are calculated or obtained. The value of at least a majority of the pixels of a selected field are added to a TLL value for each of the plurality of subset frames.

In an optional aspect, the value is defined as a luminance level.

In an optional aspect, a matching property value of the first field and the second field for each of the plurality of subset frames is calculated.

In an optional aspect, a matching property value is calculated. Each of the pixels in the selected field of a prior frame of the plurality of subset frames are accessed. A field for each of the plurality of subset frames from within the accessed pixels is selected. The square of the difference between each of the plurality of pixels in the selected field is accumulated.

In an optional aspect, a selection criteria is qualified. Determining whether there is exactly one frame in each of the one or more frame subsets that has a change in the one or more measurable parameters that is greater than a selection threshold.

In an optional aspect, the one frame that has a change in the one or more measurable parameters that is greater than a selection threshold in each of the one or more frame subsets is an isolated frame of each of the one or more frame subsets.

In an optional aspect, each of the one or more frame subsets comprises a first fields subset and a second fields subset. The selection criteria is qualified. A first flag and a first field position for the first fields subset is calculated. A second flag and a second field position for the second fields subset is calculated. A field offset is calculated and recorded by subtracting the second field position from the first field position. Indicating that the selection criteria has been met when the first flag and the second flag are true, the first field position is an isolated frame of the frame subset, and the field offset is within an offset range of one.

In an optional aspect, a first flag and a first position is calculated. The first flag is set to true and the first field position of a first chosen field in the first fields subset is saved when only the first chosen field in the first fields subset shows a change in the one or more measurable parameters that is greater than a difference threshold and otherwise setting the first flag to false. A second flag and a second position is calculated. The second flag is set to true and the second field position of a second chosen field in the second fields subset is saved when only the second chosen field in the second fields subset shows a change in the one or more measurable parameters that is greater than a difference threshold and otherwise setting the second flag to false.

In an optional aspect, at least two of the framesets are modulated. The values of selected pixels of the pixels of the content lines in a plurality of first fields of at least two of the framesets are altered.

In an optional aspect, at least two of the plurality of one or more selected frames are modulated. Selection frame based encoding commences when the selection criteria has been met.

In an optional aspect, at least two of the plurality of one or more selected frames are modulated. Selection frame based encoding commences when the selection criteria has been met.

In an optional aspect, at least two of the framesets are modulated. Selection frame based encoding commences when the selection criteria has been met.

Implementations may include one or more of the following features. For example, selection frame based encoding occurs. A predetermined pixel matrix of value modifiers is overlaid onto a plurality of first fields of at least two of the selected framesets. The predetermined pixel matrix has the same dimensions as the plurality of first fields.

The selection frame based encoding occurs. The content lines of a first field of the framesets are selectively designating as normal or inverse lines in one of one or more designation patterns. The content lines of the first field of at least two of the plurality of selected framesets are modulated.

A consistent designation pattern is selected as the one or more designation patterns. The content lines of the first field of at least two of the framesets are modulated utilizing a static pattern.

A matching property value is obtained or calculated of the first field of a subsequent frame and an additional frame. The content lines of the first field of the subsequent frame are selectively designating as normal or inverse lines in the designation pattern. The content lines of the first field of the subsequent frame are modulated utilizing the static pattern if pulldown criteria is met.

The pulldown criteria is met when the matching property value of the first field of the subsequent frame is less than a matching threshold and the matching property value of the first field of the additional frame is not less than the matching threshold.

The content lines of the first field are modulated utilizing a static pattern. A determination of whether a current line of the content lines is normal or inverse is made. A determination of whether a pattern position of the static pattern that corresponds to a current pixel of the current line is positive or negative is made. A first adjustment is made to the current pixel based on a luminance level adjustment value when the current line is normal and the pattern position is positive or the current line is inverse and the pattern position is negative. A second adjustment is made to the current pixel based on the luminance level adjustment value when the current line is normal and the pattern position is negative or the current line is inverse and the pattern position is positive. Repeating the steps for each pixel on the content line. Repeating the steps for each content line in the first field.

The first adjustment is adding the luminance level adjustment value to the current pixel. The second adjustment is subtracting the luminance level adjustment value from the current pixel.

A high luminance threshold is accessed. Determining whether adding a luminance level adjustment to a luminance level of the current pixel would exceed the high luminance threshold. The luminance level adjustment is added to the luminance level of the current pixel when adding the luminance level adjustment to the luminance level of the current pixel would not exceed the high luminance threshold. The luminance level of the current pixel is increased to the high luminance threshold when adding the luminance level adjustment to the luminance level of the current pixel would exceed the high luminance threshold.

A low luminance threshold is accessed. A determination is made as to whether subtracting the luminance level adjustment from the luminance level of the current pixel would fall below the low luminance threshold. The luminance level adjustment is subtracted from the luminance level of the current pixel when subtracting the luminance level adjustment from the luminance level of the current pixel would not fall below the low luminance threshold. Reducing the luminance level of the current pixel to the low luminance threshold when subtracting the luminance level adjustment from the luminance level of the current pixel would fall below the low luminance threshold.

A time delay is advanced after selecting a frameset to modulate when the time delay is not expired. Thereupon and when the time delay is expired, the frameset is modulated and the time delay is reset.

A detection of the mark is outputted when processing the framesets determines that the mark is present within the content signal.

Detecting the existence of changes in the one or more measurable parameters within the frames. A designated frame and a corresponding comparison frame are designated at each of the detected existence of changes in the one or more measurable parameters within the frames.

Obtaining the content signal from a broadcast source. Determining whether each of the frames of the content signal have a first field and a second field. Each of the frames of the content signal are split into a first field and a second field if each of the frames of the content signal do not have the first field and the second field.

The one or more measurable parameters are calculated or obtained for a first field for each of the plurality of subset frames. The one or more measurable parameters are calculated or obtained for a second field for each of the plurality of subset frames. A field mark intensity is calculated for the first field and the second field of each of the plurality of subset frames.

A determination of whether a pattern position of a static pattern that corresponds to a current line pixel of a current content line and a previous line pixel of a previous content line is positive or negative. A pixel difference is calculated by subtracting the previous line pixel from the current line pixel when the pattern position is positive. The pixel difference is calculated by subtracting the current line pixel from the previous line pixel when the pattern position is negative. The pixel difference is added to a pixel accumulation when absolute value of the pixel difference is less than a field mark threshold. The steps are repeated for each of the pixels on the current content line and the previous content line. The absolute value of the pixel accumulation is added to a field mark intensity accumulation. The steps are repeated for each content line in a current field. The field mark intensity accumulation is stored for the current field.

A mark measurement is calculated for a designated frame of the frame subset and a statistical output calculation is computed when the selection criteria has been adjusted.

A mark measurement is calculated for a designated frame of the frame subset. The field mark intensity is obtaining for a first field of the designated frame. The field mark intensity is obtained for a second field of the designated frame adjusted by the field offset. A mark measurement is calculated by subtracting the field mark intensity of the second field from the field mark intensity of the first field.

A mark measurement is calculated for a designated frame of the frame subset. A first field of the designated frame is selected as a first comparison field. A second field of the designated frame adjusted by the field offset is selected as a second comparison field. The field mark intensity for the first field comparison is obtained. The field mark intensity for the second field comparison is obtained. A field measurement is calculated by subtracting the field mark intensity of the second field comparison from the field mark intensity of the first field comparison. The field measurement is stored in a max array. A next field of the first field subset is selected as the first comparison field. The next field of the second field subset is selected as the second comparison field. The steps are repeated until either or both the first field subset or the second field subset has no next field. A mark measurement is set to the largest magnitude value in the max array.

A statistical output calculation is computed. The mark measurement is evaluated against a calculation matrix to obtain a weighted mark value. The weighted mark value is added to an evaluation accumulator. The mark is asserted as present in the modulated signal when the evaluation accumulator is greater than an evaluation threshold.

A statistical output calculation is computed. The mark measurement is evaluated against a positive calculation matrix to obtain a weighted mark value and the weighted mark value is added to a positive evaluation accumulator when the mark measurement is greater than zero. The mark measurement is evaluated against a negative calculation matrix to obtain the weighted mark value and the weighted mark value is added to a negative evaluation accumulator when the mark measurement is not greater than zero. The mark is asserted as present in the content signal when either the positive evaluation accumulator is greater than a positive evaluation threshold or the negative evaluation accumulator is less than a negative evaluation threshold.

The positive evaluation accumulator and the negative evaluation accumulator are reset after the mark has been asserted.

The content signal is analyzed. One or more visual discontinuities are located in the frames to identify framesets that each are offset from the frames having the one or more visual discontinuities.

A frameset is selected because a detector can identify at least a significant number of the framesets from among the frames as designated by an encoder. A frameset is selected because of the benefits of temporal discontinuity of adjacent non-identical images of the frames of the content signal.

The high amplitude modulation has a short encoding persistence afforded by the ability to identify the plurality of one or more selected frames among the frames. The high amplitude signal is imperceptible because of a significant amount of dynamic visual changes that occur at each of the plurality of one or more selected frames causing the mark to be much less visually significant.

The pixels of the frame are modulated based on a static pattern. The content lines of a modulation field of the frame are selectively designated as normal or inverse lines in a designation pattern. The content lines of the modulation field of the frame are modulated based on the static pattern.

A first field of the frame is selected as a modulation field. A second field of the frame is selected as a reference field.

The content lines of a first field of the frame are modulated based on the static pattern. The value of each of the pixels of the modulation field are selectively altered based on the static pattern.

The content lines of a first field of the frame are modulated based on the static pattern. The value of each of the pixels of the modulation field are selectively altered based on the static pattern and a magnitude defined by an operator.

The value of each of the pixels of the modulation field is selectively altered. The value of each of the pixels of the modulation field is selectively altered within a tolerance range. The value of less than all of the pixels of the reference field is altered. The value is defined as a luminance level. The value adjustment is defined as a luminance level adjustment.

The pixels of the frame are modulated based on a pattern that has a high degree of correlation to the static pattern. The static pattern is defined as a gramelchupp static pattern.

The modulated frames are circumvented. Each of the modulated frames are replaced with one or more unmodulated frames that have been repeated.

Each of the frames comprises a first field and a second field. The modulated frames are circumvented. It is determined for each of the modulated frames whether the first field or the second field is a modulated field. An unmodulated field replaces the modulated field for each of the modulated frames. An inverted signal is modulated in the modulated field thereby canceling modulation of the modulated frames.

The frame is selected to be modulated or demodulated. Several frames are identified that have attributes of a change in one or more measurable parameters as identified frames for modulation or demodulation. At least one frame is selected for modulation or demodulation among the identified frames.

The attributes of a change in one or more measurable parameters is a change in the TLL value in comparison to a previous frame. The modulation or demodulation is demodulation. The modulation or demodulation is modulation. A frame is selected to be demodulated by utilizing at least a substantially similar process that was used to identify a frame having attributes corresponding to a change in one or more measurable parameters as the frame to be modulated. The frame that is selected is demodulated. Selected by at least a substantially similar process is selected by an identical process.

The content lines of a first field of the frame are selectively designated as normal or inverse lines in a designation pattern and the content lines of the first field of the frame are modulated utilizing a static pattern.

It should be recognized that various methods, corresponding structures, computer programs and code segments are all contemplated with various implementations. These and other features and advantages may be more clearly understood and appreciated from a review of the following detailed description of the disclosed embodiments and by reference to the appended drawings and claims.

BRIEF DESCRIPTION OF THE DRAWINGS

FIG. 1A is a simplified block illustration of a movie film strip;

FIG. 1B is simplified block illustration of a video signal with a source of a movie film strip;

FIG. 2 is a flowchart of an encoding system;

FIG. 24 is a table of a positive calculation matrix;

FIG. 25 is a table of a negative calculation matrix;

FIG. 32 is a flowchart of a third alternate method of calculating a change in measurable parameter for a field;

FIG. 33 is a block diagram of a playback device;

FIG. 34 is a flowchart of a method of circumventing by detection of a change in measurable parameter; and FIG. 35 is a flowchart of a method of circumventing by detection of a modulated frame.

Corresponding reference characters indicate corresponding elements among the several views. The headings used in the figures should not be interpreted to limit the scope of the figures.

DETAILED DESCRIPTION OF THE PREFERRED EMBODIMENTS

Figure 3:
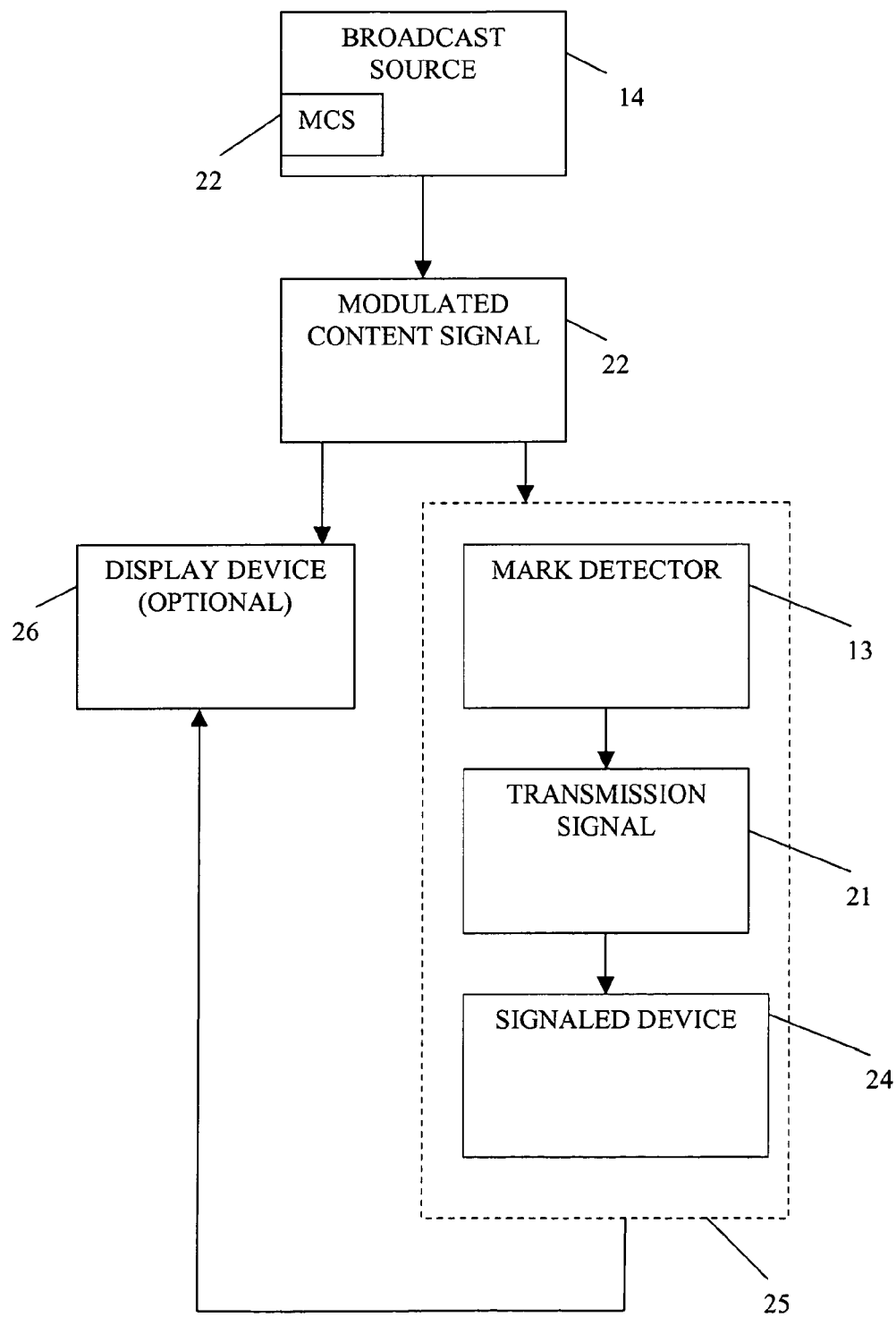
FIG. 3 is a flowchart of a detecting system.

In general, a method and system for modulating and detecting a mark within a content signal by detecting a change in one or more measurable parameters is illustrated in FIGS. 2-35.

With respect to NTSC video systems, we refer to the process of 3-2 pulldown as a process for turning 24 frames per second of a film signal into 30 frames or roughly 30 frames per second (i.e., 29.97 frames per second) of video signal. Since the 3-2 pulldown reorders and replicates fields, an improvement is desirable to account for both 3-2 pulldown and inverse 3-2 pulldown (i.e., when 30 frames are converted back into 24 frames). The reordering and replicating of fields with 3-2 pulldown is shown in FIGS. 1A and 1B.

Referring to FIG. 1A, an exemplary embodiment of a film signal 19 is shown to comprise four sequential frames of film signal 19 as a movie A frame 700, a movie B frame 702, a movie C frame 704 and a movie D frame 706. When a film signal 19 is converted into a content signal 18 in NTSC video format (as shown in FIG. 1B) the frames of film signal 19 typically cannot be converted 1:1 into frames of content signal 18 because the frames of film signal 19 are at a frame rate of twenty-four frames per second, while the frame rate of content signal 18 under the NTSC standard is 30 frames per second.

Referring to FIG. 1B, content signal 18 with source of film signal 19 first includes a first frame with movie A1 field 710 as a first field and a second movie A2 field 712 as a second field. A second frame of content signal 18 repeats movie A1 field 710 for a first field and has a movie B2 field 714 for the second field. A third frame of content signal 18 includes a movie B1 field 713 as a first field and a movie C2 field 718 as a second field. A fourth frame of content signal 18 includes a movie C1 field 716 and repeats movie c2 field 718. Finally, a fifth frame of content signal 18 includes a movie D1 field 720 and a movie S2 field 722. Thus, the four frames of film signal 19 are converted into five pairs of fields of content signal 18 by 3:2 pulldown. Other methods of signal conversion are also contemplated to produce content signal 18, such as when converting film signal 19 in content signal 18 that is not based in NTSC (National Television Standards Committee) format since any transformation that compromises the ability of a detector to recover encoding marginalizes the ability of the system to detect and thereby making it desirous to address the issue on the encoder as much as possible.

Referring to FIG. 2, an implementation of modulation is illustrated. In this implementation, a content signal 18 is transmitted from a signal source 10 to an encoder 12. Content signal 18 is a sequence of images and optionally associated audio. Content signal 18 may include standard definition (SD) or high definition (HD) content signals in NTSC, PAL (Phase Alternation Line), SECAM (Systeme Electronique Couleur Avec Memoire), sequence of bitmaps or other signal formats that transport a sequence of images. The form of content signal 18 may be modified to enable implementations involving content signals of various formats and resolutions. For example, in one implementation, two fields are artificially created for each frame of content signal 18 as needed and when not otherwise present, while in another implementation, each frame of content signal 18 includes two interlaced fields.

Signal source 10 is a unit that is capable of transmitting and/or reproducing a sequence of images electrically in the form of content signal 18. Examples of signal sources 10 include a professional grade video tape player with a video tape, a camcorder, a video file server, a computer with an output port and a digital versatile disc (DVD) player with a DVD disc. Encoder 12 is described in greater detail below.

Operator 16 interacts with encoder 12 to control its operation to modulate mark 20, thereby producing a modulated content signal 22 that is provided to a broadcast source 14. Operator 16 may be a person that interacts with encoder 12 through the use of a computer or other electronic control device, or operator 16 may consist entirely of computer hardware and/or software, or other electronic control device that directs operation of encoder 12 in an automated manner.

A mark 20 is selectively modulated within content signal 18 by encoder 12 for signaling purposes. Mark 20 is generally a nondata carrying signal which is embedded in the active portion of content signal 18 as described in greater detail below. In one implementation, mark 20 is: (i) nondata carrying in that it is not plural or multi-bit, (ii) not a random, pseudo random or other noise-like signal that may not be driven by a defined algorithm but rather a defined/static signal, (iii) not encoded at or below the noise floor but rather above the noise floor, and (iv) not a steganographic signal. Mark 20 may be embedded within content signal 18 to indicate that rights are associated with content signal 18. However, other implementations of mark 20 are also contemplated. Upon modulating content signal 18, encoder 12 outputs a modulated content signal 22 including content signal 18 and mark 20. The method of modulating content signal 18 is described in greater detail below.

In one embodiment, mark 20 does not protect content signal 18 as it does not have any data associated with it. Rather, mark 20 acts as a rights assertion mark, which is a mark that asserts that rights are associated with content signal 18. For instance, in one implementation, information is conveyed through the mere existence or absence of a mark 20 within the content signal, such that mark 20 acts as a binary or dual state indicator (i.e., the absence of mark 20 signifies a first state and the presence of mark 20 signifies a second state). The actual rights are carried in the CGMS-A signaling transport such that copy protection robustness is added when CGMS-A is removed either intentionally or incidentally, or when CGMS-A is not inserted by a device when required.

Modulated content signal 22 is provided to a broadcast source 14 for distribution and/or transmission to an end-user ("viewer") who will view the content associated with modulated content signal 22. Broadcast source 14 delivers content to one or more viewers in formats including analog or digital video by storage medium such as DVD, tapes, and other fixed medium or by transmission sources such as television broadcast stations, cable, satellite, wireless and Internet sources that broadcast or otherwise transmit content.

Referring to FIG. 3, an implementation of detection is implemented. In this implementation, broadcast source 14 provides modulated content signal 22 to a recording system 25 and optionally to display device 26. Recording system 25 includes a mark detector 13, which is a device that is capable of detecting mark 20 within modulated video signal 22. When mark 20 is deemed by mark detector 13 to be present with a threshold level of certainty, mark detector 13 provides an indication that mark 20 has been detected ("detections") to a signaled device 24.

Signaled device 24 is a device that is capable of receiving and utilizing detections to trigger an event on signaled device 24, where the event generally indicates the presence of rights associated with modulated content signal 22. Signaled device 24 may be a DVD recorder, PC based or consumer electronic based personal video recorder or other device capable of recording content to be viewed or any device that performs an analog to digital conversion for the purpose of storing, redistributing and/or subsequently outputting or otherwise making modulated content signal 22 available in an unauthorized and/or impermissible manner. Signaled device 24 may be made integral with mark detector 13, or configured otherwise.

Mark detector 13 provides the detections to signaled device 24 by use of a transmission signal 21. Transmission signal 21 may include a wireless radio frequency, infrared and direct wire connection as well as other transmission mediums by which signals may be sent and read. Recording system 25 may include separate components or combined in a single unit.

Optional display device 26 receives modulated content signal 22 either directly from broadcast source 14 or indirectly through recording system 25. Display device 26 may be a device capable of presenting content signal 18 (and modulated content signal 22) to a viewer such as an analog or digital television, but may also or alternatively may include a device capable of recording content signals 18 such as a digital video recorder. Display device 26 and recording system 25 or display device 26 and signal device 24 may be integrated into a single unit, or they may each be physically distinct.

Figure 4:
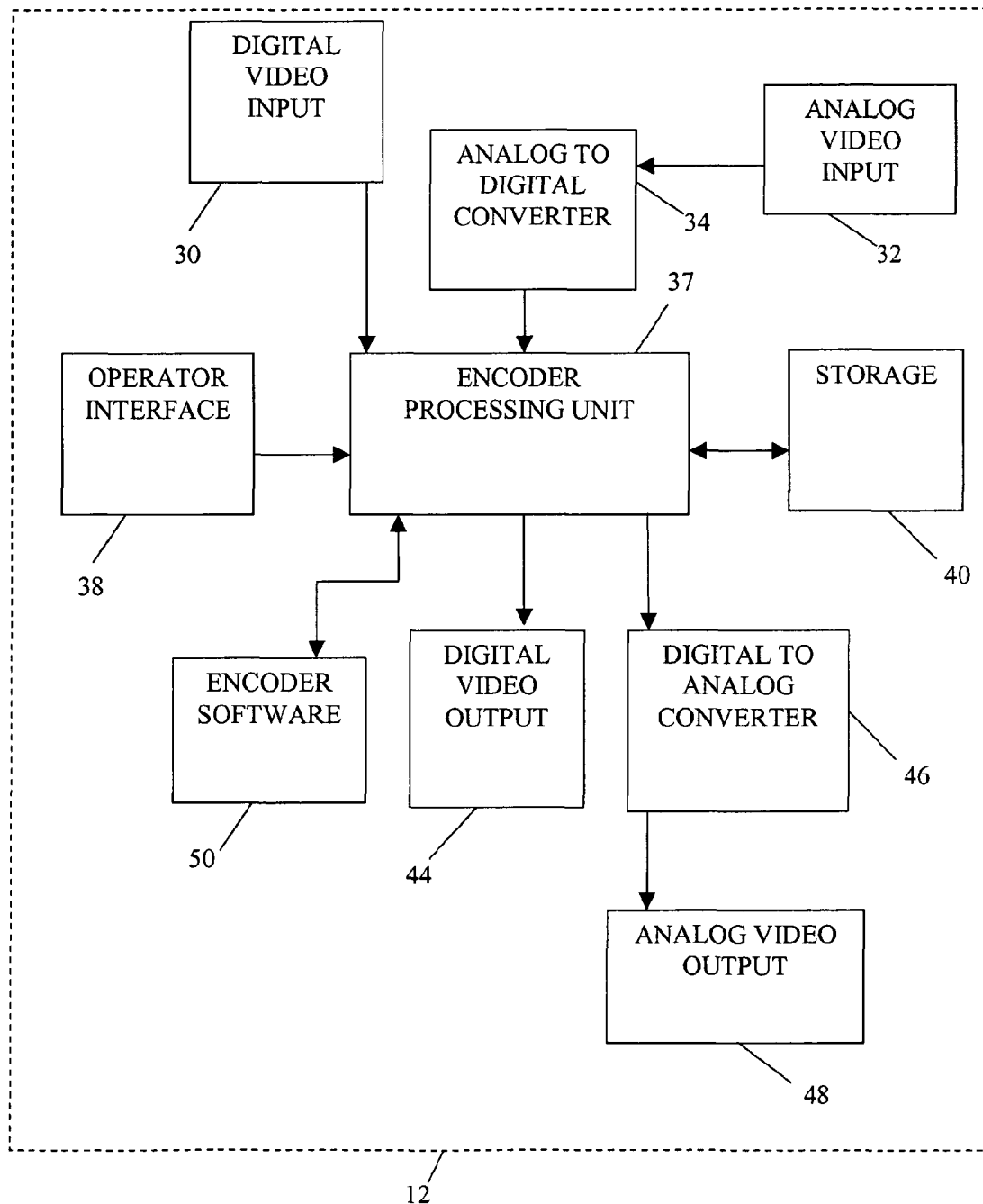
FIG. 4 is a block diagram of an encoder.

Referring to FIG. 4, an implementation of encoder 12 is illustrated. In this implementation, encoder 12 includes an encoder processing unit 37 that directs operation of encoder 12; a digital video input 30, an analog to digital converter 34 and an analog video input 32 to receive content signal 18, a digital video output 44, digital to analog converter 46 and analog video output 48 to output modulated content signal 22; operator interface 38 and encoder software 50 to direction operation of encoder 12; and storage 40 to provide signal storage.

Encoder processing unit 37 alters attributes of content signal 18 to produce modulated content signal 22 containing mark 20. In general, encoder 12 may be a computer with specialized input/output hardware, but may also be an application specific circuit, programmable hardware, an integrated circuit, an application software unit, or hardware and/or software combination. Encoder processing unit 37 may include a central processing unit (CPU).

Digital video input 30 is operative with encoder processing unit 37 and is capable of receiving content signal 18 from signal source 10. However, encoder 12 may alternatively or also receive an analog content signal 18 through an analog video input 32 and an analog to digital converter 34. Analog to digital converter 34 digitizes the analog content signal 18 according to known techniques such that the digitized content signal 18 may be provided to encoder processing unit 37.

Operator interface 38 is operatively associated with encoder processing unit 37 and may provide encoder processing unit 37 with instructions including where, when and at what magnitude encoder 12 should selectively raise and lower a value such as the luminance (or chrominance) level of content lines of content signal 18 or portions thereof at the direction of operator 16. Instructions are received by operator interface 38 through a serial port or an integrated operator interface (not shown). However other device interconnects of encoder 12 are contemplated including a universal serial bus (USB), "Firewire" protocol (IEEE 1394), and various wireless protocols. In one embodiment, responsibilities of operator 16 and operator interface 38 are partially or wholly integrated with encoder software 50 such that encoder 12 operates in an automated manner.

When encoder processing unit 37 receives operator instructions and content signal 18, it stores the luminance information (and/or chrominance information as desired) of content signal 18 in storage 40. Storage 40 has the capacity to hold and retain signals (e.g., fields of content signal 18 and corresponding audio signals) in a digital form for access by encoder processing unit 37. Storage 40 may be primary storage and/or secondary storage, and may include memory.

After modulation, encoder 12 sends the resulting modulated content signal 22 in a digital format through a digital video output 44, or in an analog format by converting the resulting digital signal with a digital to analog converter 46 and outputting the modulated content signal 22 by an analog video output 48. However, encoder 12 (and mark detector 13 as described below) need not include both digital video input 30 and digital video output 44 in combination with analog video input 32 and analog video output 48. Rather, a lesser number of the inputs and/or outputs may be included. In addition, other forms of inputting and outputting content signal 18 (and modulated content signal 22) may be interchangeably used, such as when content signal 18 is not in the form of a video signal.

The specific components used by encoder 12 may differ when its technology is included in a pre-existing device as opposed to a stand alone custom device. Encoder 12 may include varying degrees of hardware and software, as various components may interchangeably be used.

Figure 5:
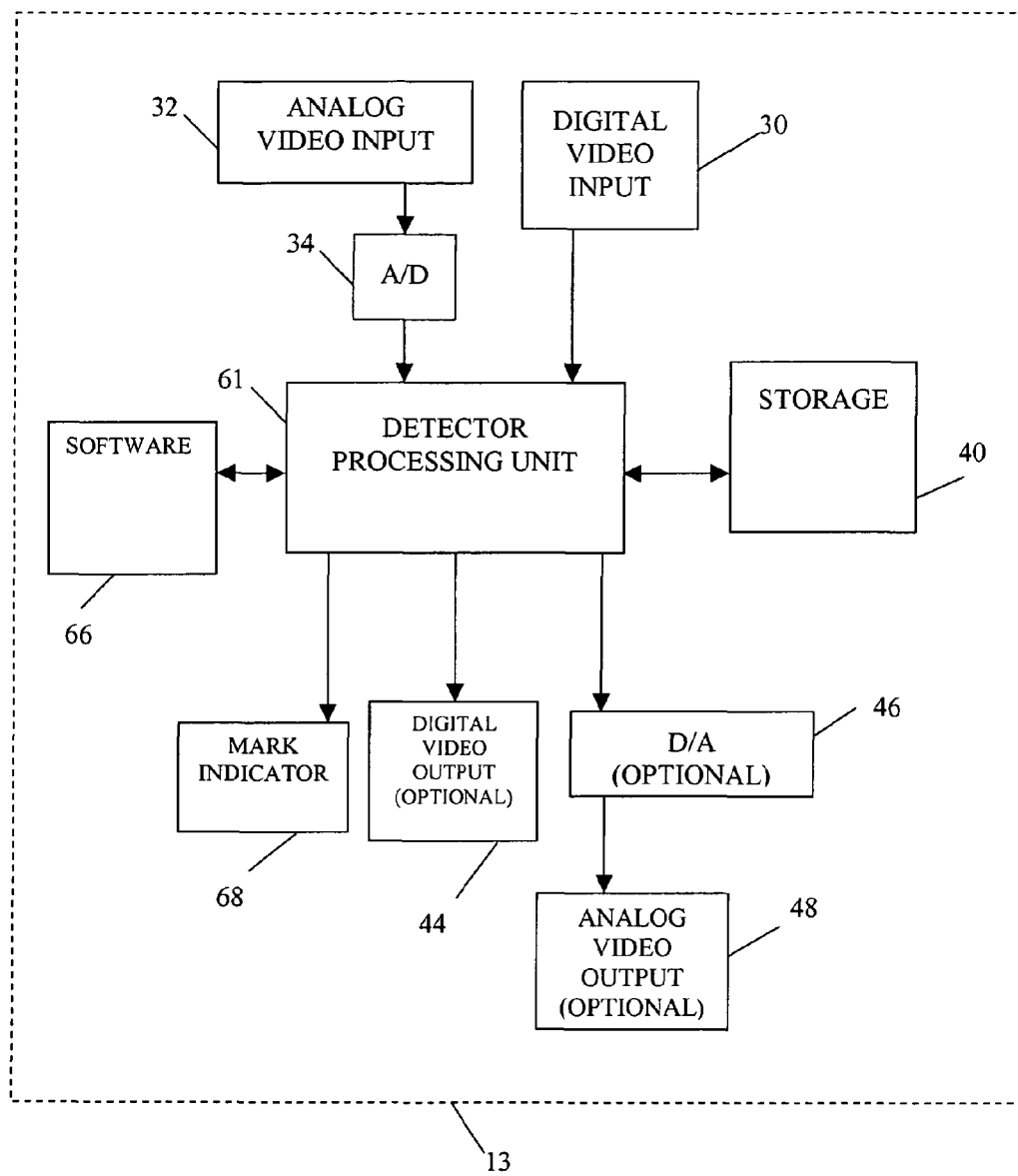
FIG. 5 is a block diagram of a detector.

Referring to FIG. 5, an implementation of mark detector 13 is illustrated. In this implementation, mark detector 13 includes a detector processing unit 61 that directs operation of mark detector 13, a digital video input 30, an analog to digital converter 34 and an analog video input 32 to receive content signal 18, an optional digital video output 44, an optional digital to analog converter 46 and an optional analog video output 48 to output modulated content signal 22; a mark indicator 68 to output an detection of mark 20; and software 66 to direction operation of detector 13; and storage 40 to provide signal storage.

Mark detector 13 includes an analog video input 32 to receive modulated content signal 22 from broadcast source 14 when modulated content signal 22 is analog, and a digital video input 30 for receiving modulated content signal 22 when digital. Digital video input 30 in one embodiment directly passes modulated content signal 22 to a detector processing unit 61, while analog video input 32 digitizes modulated content signal 22 by use of analog to digital converter 34 before passing modulated content signal 22 to detector processing unit 61. However, other configurations of inputs and outputs of modulated content signal 22 are also contemplated.

Detector processing unit 61 processes modulated content signal 22 to detect mark 20. Detector processing unit 61 may be an application specific circuit, programmable hardware, integrated circuit, application software unit, or hardware and/or software combination are also contemplated.

In one embodiment, detector processing unit 61 stores the luminance of modulated content signal 22 in storage 40 and detects content lines or portions thereof that have increased or decreased luminance level. One embodiment of the detection scheme is described in greater detail below.

Detections are transferred from mark detector 13 to signaled device 24 by a mark indicator 68. In one embodiment, mark detector 13 also may optionally output the modulated content signal 22 in digital format through digital video output 44 as well as output modulated content signal 22 in analog format by first converting modulated content signal 22 from the digital to analog format by use of digital to analog converter 46, and then outputting modulated content signal 22 through analog video output 48. However, in another embodiment, mark detector 13 need not output modulated video signal 22 unless otherwise desired.

Referring back to FIGS. 2 and 4, mark 20 in one embodiment is modulated within content signal 18 by use of encoder 12. In one embodiment, mark 20 is modulated within content signal 18 by selecting a plurality of one or more selected frames from among the plurality of frames of content signal 18, and modulating at least two of the plurality of one or more selected frames, wherein modulation of at least two of the plurality of one or more selected frames causes mark 20 to be present within content signal 18. In the one embodiment as will be described in greater detail below, the one or more selected frames consists of one frame at a zero offset from the CMP frame (i.e., the one or more selected frames is the CMP frame).

In one embodiment, the use of the term "CMP frame" means that a frame in a content signal has a change in one or more measurable parameters when compared to a previous frame; the use of the term "previous frame" means a frame in a content signal that immediately proceeds a CMP frame; and the use of the terms "selected frame" or "selected frames" means one or more frames, at a frame offset of zero or more frames from the CMP frame, that may be modulated or detected.

Figure 6:
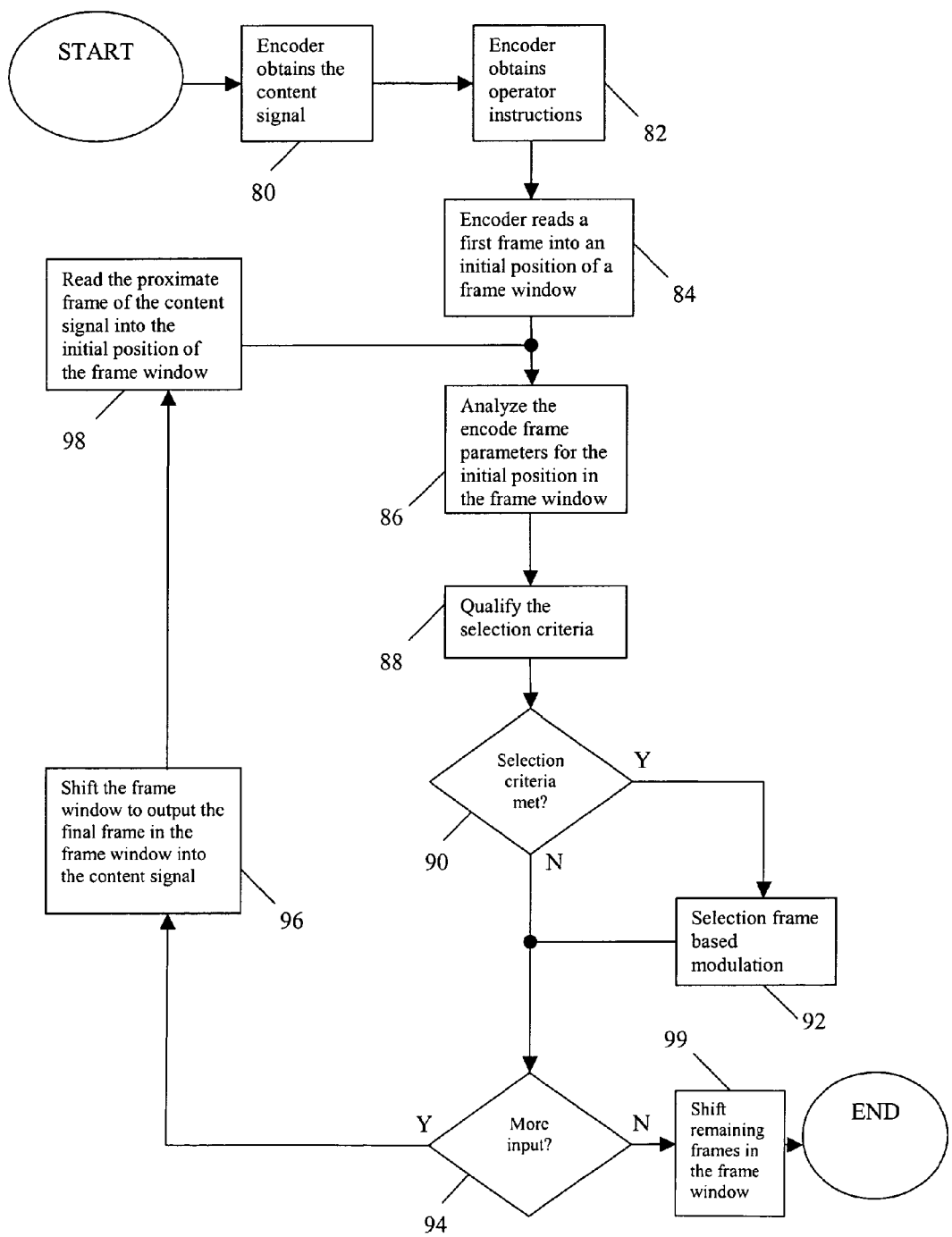
FIG. 6 is a flowchart of a modulation method.

Referring to FIG. 6, an implementation of a method for modulating mark 20 in content signal 18 is illustrated. In this implementation, the method first includes a step 80 where encoder 12 obtains content signal 18 from a signal source 10. Thereafter, encoder 12 at step 82 obtains the operator instructions on the frames of content signal 18 that are to be analyzed for possible modulation, an implementation of which is described in greater detail below.

Encoder 12 at step 84 inserts the first frame of content signal 18 in an initial frame 108u of a frame window 100 (both of which are described in greater detail below). If a frame of content signal 18 is not in the form of a first field and a second field, encoder 12 may arbitrarily split the frame into two corresponding fields (i.e., a first field and a second field). Encoder 12 analyzes the encoded frame parameters for initial frame 108u of frame window 100 at step 86 as described in greater detail below.

Encoder 12 qualifies the selection criteria to determine if the conditions are desirable for modulation at step 88. One embodiment for qualifying the selection criteria is to locate one, and only one, change in one or more measurable parameters in the first fields in the frame window that falls within the isolated frame (e.g., locating a single CMP frame in a frame subset). However, other selection criteria may be used so long as both encoder 12 and mark detector 13 are capable of utilizing the same method to identify the one or more selected. An implementation of a method for qualifying the selection criteria is described in greater detail below.

Encoder 12 at decision point 90 determines if the selection criteria is met. If yes, encoder 12 performs selection frame based modulation at step 92, an implementation of which is described in greater detail below. If no, encoder 12 proceeds directly to decision point 94.

Encoder 12 at decision point 94 determines if more input is available, such as another frame of content signal 18 or operator instructions from operator 16. If yes, encoder 12 at step 96 shifts frame window 100 to output a frame of content signal 18 at a final frame 108a and move every frame one position such that initial frame 108u is free. At step 98, encoder 12 reads another frame of content signal 18 into initial frame 108u of frame window 100 before returning to step 86. If no, an implementation of the method for modulating frames of content signal 18 is complete.

As described herein, frame window 100 is utilized in one implementation for purposes of modulation, detection or circumvention. In another embodiment, analyzing the plurality of frames of content signal 18 may be achieved by use of one or more frame subsets, wherein each frame subset (1) is a subset of the plurality of frames of content signal 18, and (2) has a plurality of subset frames.

It should be further appreciated that the present method of modulation enables a low visual perception of modulation even at a high amplitude.

In one embodiment, the use of the term "first field" may refer to the first original field, while in another embodiment, the second field (e.g., the interlaced field) of a frame of content signal 18 or modulated content signal 22 refers to the first field. In both of the foregoing embodiments, the "second field" refers to the other field in the frame.

Figure 7:
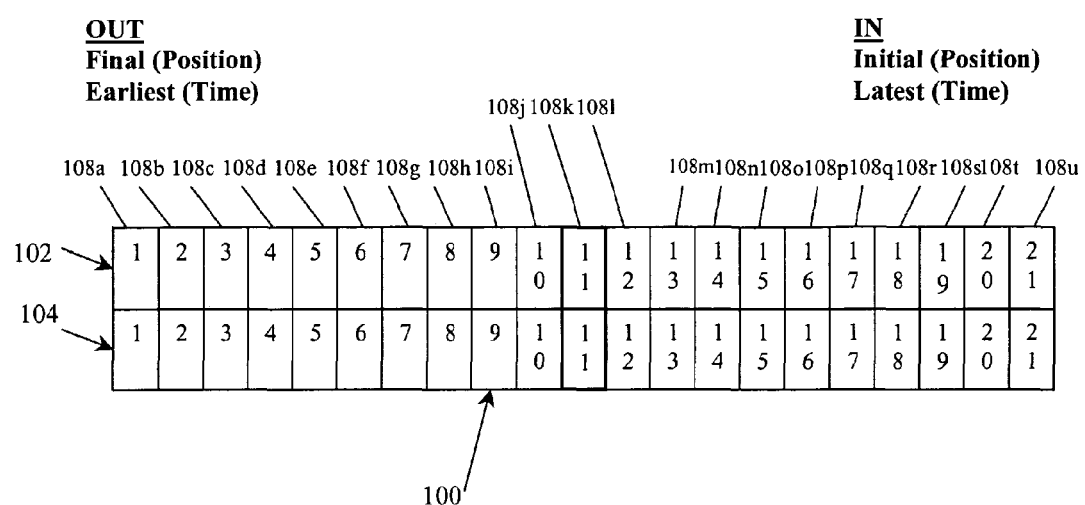
FIG. 7 is a simplified block illustration of a frame window.

Referring to FIG. 7, an implementation of frame window 100 is illustrated. In this implementation, frame window 100 is shown to comprise a first fields window 102 and a second fields window 104. Frame window 100 is used in one embodiment to specify adjacent frames for comparison and analysis with modulation, detection and circumvention. In one implementation, frame window 100 is a FIFO queue that is capable of storing frames of content signal 18 (or modulated content signal 22) and associated frame data including audio and frame parameters. While this implementation requires a frame window of at least two frames, a greater or fewer number of frames may be utilized by other implementations, however an implementation with one frame could have limited functionality with the various embodiments described herein. For example, at least three frames may be required. Frame window 100 may also be in the form of a linked list, circular buffer or other implementations. While frame window 100 is one implementation of encapsulating a subset of frames to be analyzed, other methods are contemplated.

In the implementation of FIG. 7, frame window 100 is shown to include twenty-one frame positions 108a-u, with each frame position consisting of a first field, a second field, and associated field data for each field. Initial frame position 108u is at the initial position of frame window 100 and is the position that receives new frames of content signal 18 or modulated content signal 22. Middle frame 108 is the isolated frame position in frame window 100, such that in one implementation there are an equal number of frame positions on either side of isolated frame position in frame window 100. However, other implementations may designate a different frame as the isolated frame for modulation and detection purposes so long as encoder 12 and mark detector 13 consider the identical frame position in frame window 100 (or subset frame in a frame subset) the isolated frame. Final frame position 108a is the final position on frame window 100 that when shifted outputs its frame to comprise content signal 18 or modulated content signal 22. In another embodiment, frame window 100 when used with mark detector 13 need not store frames of content signal 18 but may instead only store the frame parameters.

Figure 8:
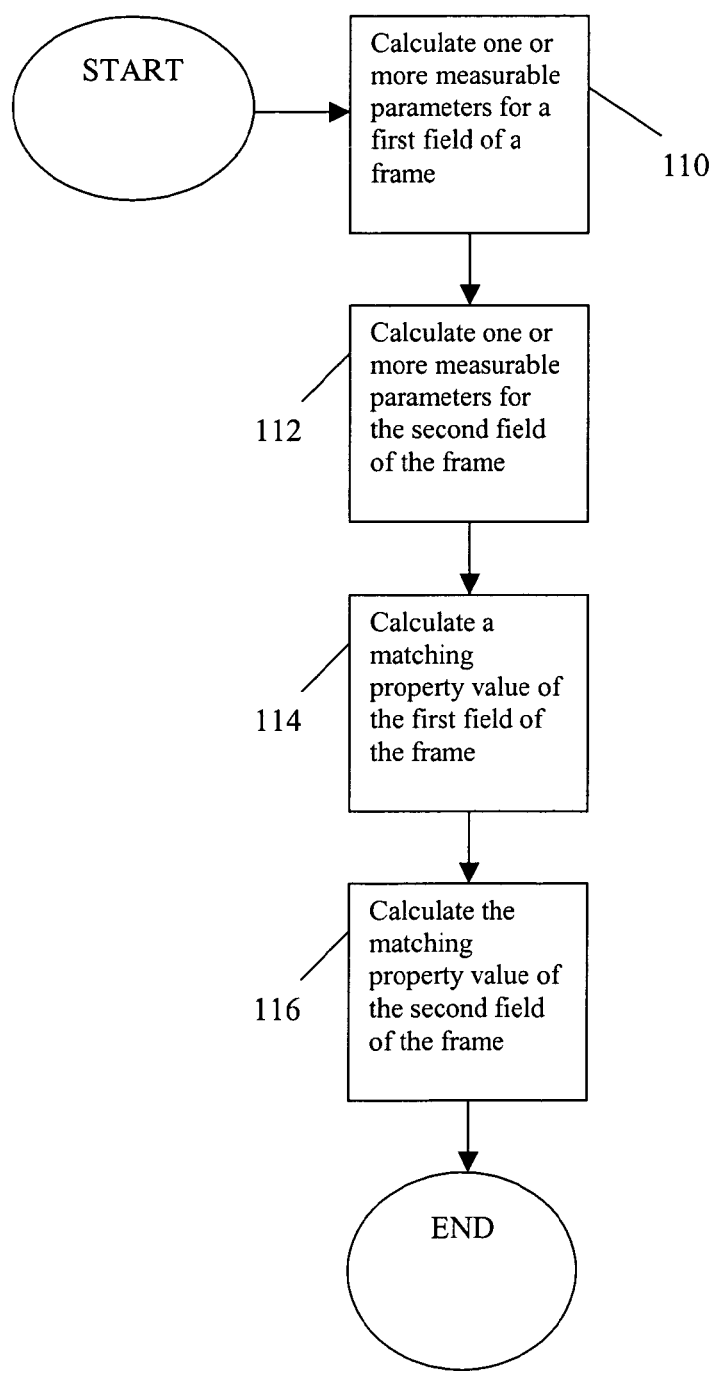
FIG. 8 is a flowchart of a method of analyzing the encode frame parameters.

Referring to FIG. 8, an implementation of a method for analyzing the encode frame parameters is illustrated. In this implementation, the method first includes encoder 12 first calculating one or more measurable parameters for a first field of a frame at step 110. A measurable parameter is a parameter that a device such as encoder 12 and mark detector 13 can identify about a frame of content signal 18 (and modulated content signal 22) for the purpose of inserting mark 20 in content signal 18 and locating mark 20 in modulated content signal 22 by synchronizing and locating frames. Examples of measurable parameters include total luminance level, scene changes, frames with a brightness above a set level, a black frame, a frame after a fade to black, and a field to field difference calculation. After calculation for the first field of the frame at step 110, encoder 12 calculates the measurable parameter of a second field of the frame at step 112. One method of calculating one or more measurable parameters for a field is calculating a single measurable parameter for a field, which is described below.

After the one or more measurable parameters are calculated for the frame, encoder 12 calculates a matching property value for the first field of the frame at step 114. Thereafter, at step 116, encoder 12 calculates the matching property value for the second field of the frame. Steps 110, 112, 114 and 116 may occur in any order. An implementation of calculating a matching property value for a field is also described in greater detail below.

Figure 9:
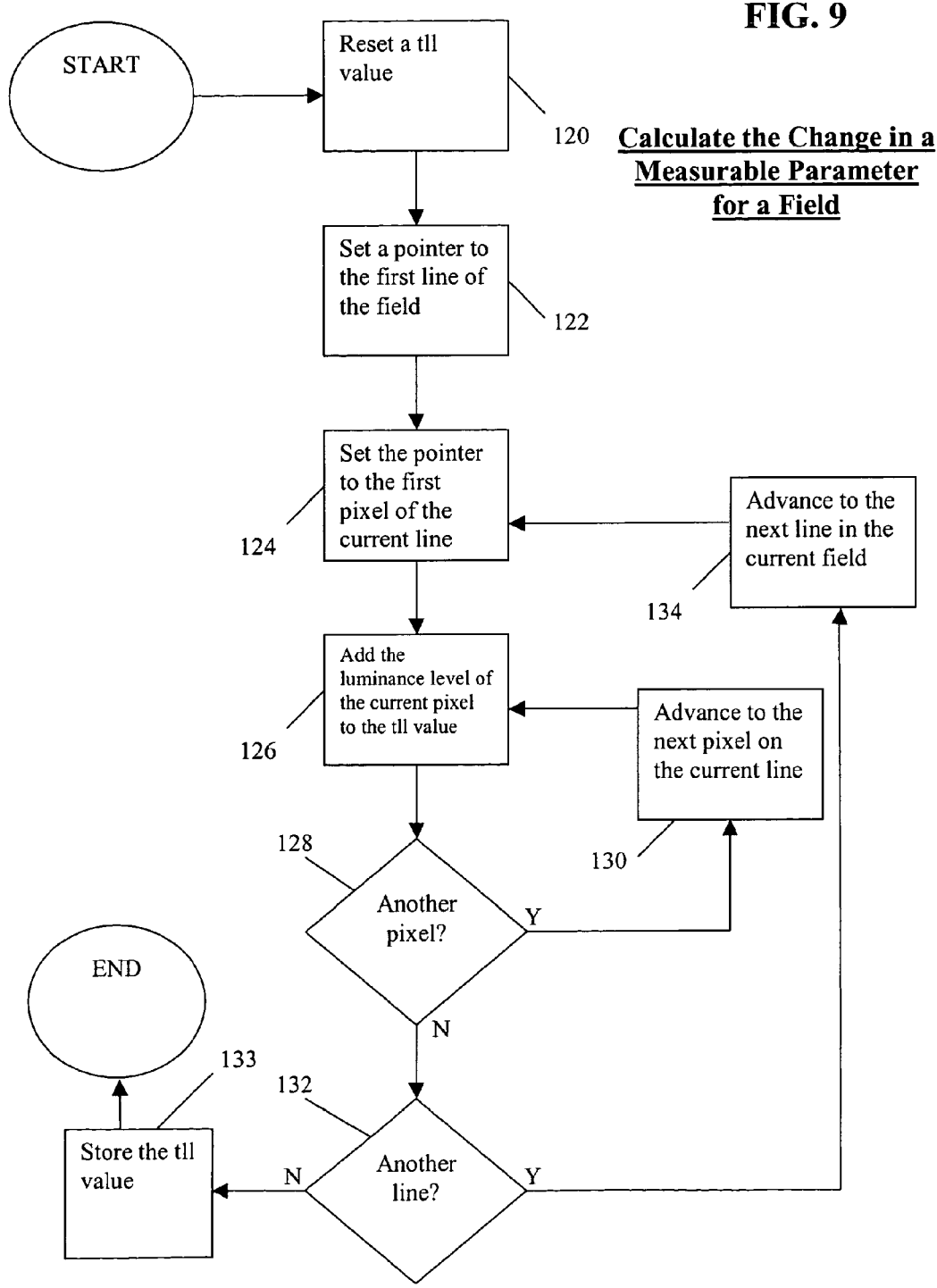
FIG. 9 is a flowchart of a method of calculating a measurable parameter for a field.

Referring to FIG. 9, one embodiment for calculating one or more measurable parameters for a field includes a step 120 where a device, such as encoder 12, mark detector 13 or playback device 25, resets a total luminance level (TLL) value. The TLL value, upon completion of the present embodiment, represents the total luminance level of a field. When TLL values from one field of a CMP frame show a discontinuity when compared with TLL values for the same field in a previous frame, a change in measurable parameter will be detected.

The device sets an mp calculation pointer to the first content line of the field of content signal 18 at step 122. At step 124, the device then sets the mp calculation pointer to the first pixel of the current content line. Thereafter, the device at step 126 adds the luminance level of the current pixel to the TLL value.

At decision point 128, the device determines if there is another pixel on the content line. If yes, the device advances the mp calculation pointer to the next pixel on the current line at step 130 and returns to step 126. If no, the device proceeds to decision point 132.

The device at decision point 132 determines whether there is another content line in the current field. If yes, at step 134 the device advances the mp calculation pointer to the next content line in the current field and returns to step 124. If no, the TLL value is stored at step 133 and thereafter one embodiment for calculating one or more measurable parameters for a field is complete.

The foregoing illustrates one method for calculating one or more measurable parameters by adding the value of a majority of the plurality of pixels of a selected field to a TLL value. However, alternate methods of performing such calculation are also contemplated.

When an embodiment refers to identifying changes in one or more measurable parameters in content signal 18 or modulated content signal 22, the change in one embodiment is a significant change such that a device (e.g., encoder 12, mark detector 13 and playback device 25) can identify significant change even with degradation of the content signal 18 or modulated content signal 22. In one embodiment, while the normal TLL change between two fields is usually far less than 1% (e.g., approximately 0.05% of full scale), the TLL change of a significant change is greater than 1% (e.g., approximately 24 times as big as an average change). In another embodiment, the significant change is a gramelchupp significant change such that a 1.46% of full scale change is the threshold for a significant change (e.g., when the range of TLL for a field is 720*243*1024=179,159,040, the threshold for a significant change is 720*243*15=2,624,400).

In one embodiment, the use of the term "reset" means to set something to a zero value. However, an arbitrary base-line value (e.g., to a designated maximum of a countdown counter) may be used in another embodiment in place of the zero value.

In one embodiment, the use of the term "first pixel" means the zero pixel on a content line. Although the first pixel in another embodiment may also be at a pixel offset from the first pixel, the first pixel is generally toward the beginning of the content line. In addition, the same pixel offset from the zero pixel to the first pixel may be used with the last pixel such that the content line does not use a number of pixels at the beginning or end of each content line in one embodiment. In another embodiment, the first pixel is at a pixel offset of eight pixels from the zero pixel on the content line and the final eight pixels on the content line are not used.

In one embodiment, the use of the term "first line" or "first content line" means the first line of the active portion of content signal 18. In another embodiment, an arbitrary line of the active portion of the content signal 18 may be designated as the first line. Although the first line may also be a line offset from the first line of the active portion of content signal 18, the first line is generally toward the beginning of the field. In addition, the same line offset from the first line may be used with the last line such that the field does not use one or more lines at the beginning and/or end of the field in one embodiment. In another embodiment, the first line is at a line offset of eight lines and the final eight lines of the field are not used.

Figure 10:
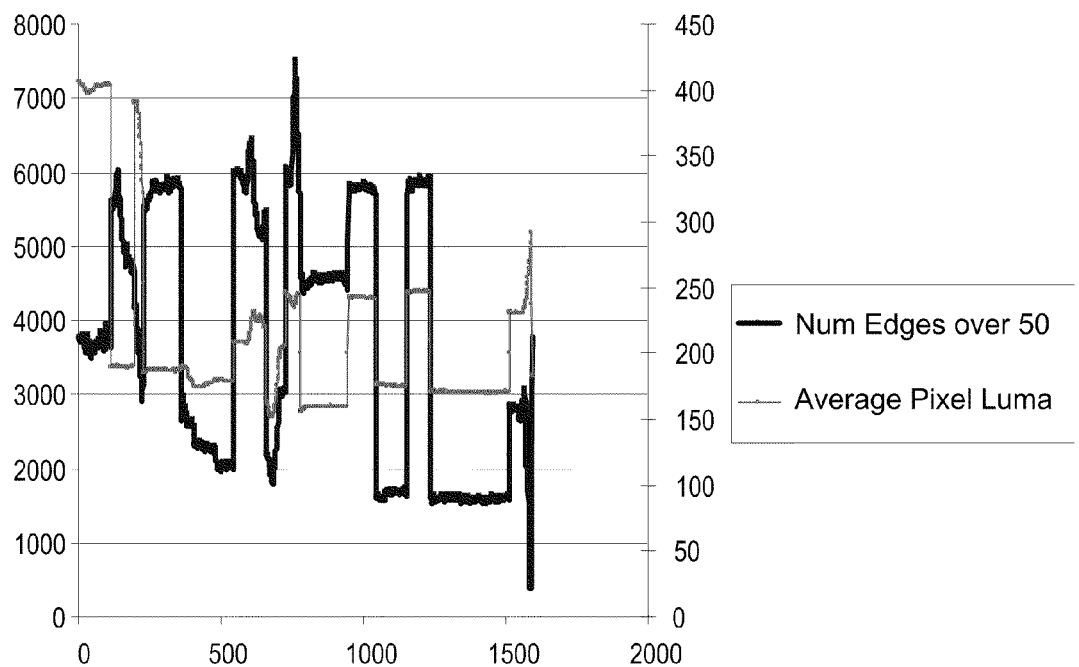
FIG. 10 is a measurable parameter comparison chart.

Referring to FIG. 10, a chart plotting average pixel luminance level (which is proportional to total luminance level) and number of edges over 50 is shown for an exemplary embodiment of content signal 18. Accordingly, the chart demonstrates the stark changes in pixel luminance and edges over a series of frames in content signal 18 and the isolated changes in measurable parameters that are good locations for identifying frames for the purposes of modulating and detecting mark 20 within content signal 18 as described above.

Figure 11:
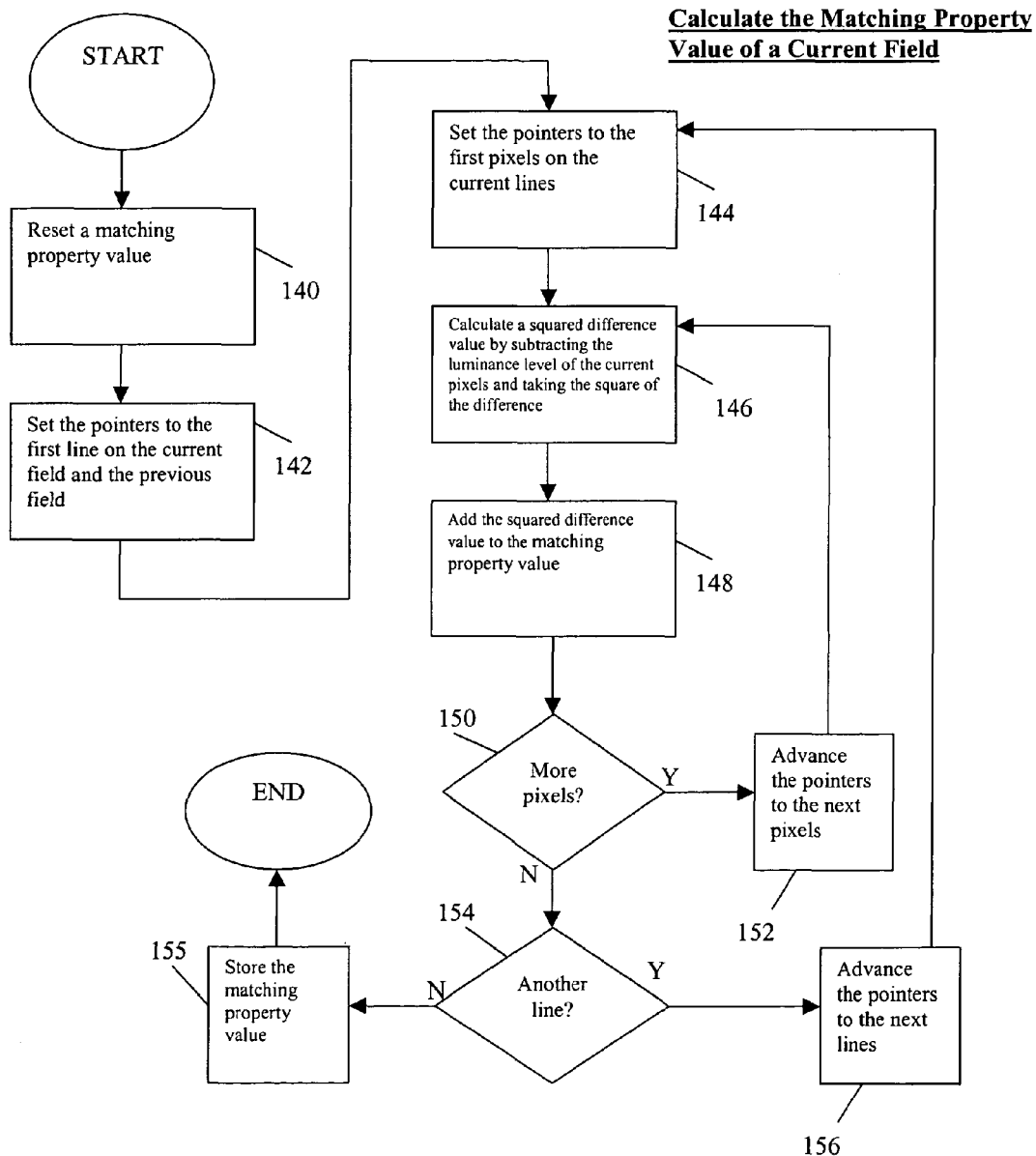
FIG. 11 is a flowchart of a method of calculating the matching property value of a current field.

Referring to FIG. 11, an implementation of calculating a matching property value of a current field is illustrated. In this implementation, the method first includes a step 140 where encoder 12 resets a matching property value, wherein the matching property value represents the similarity of corresponding pixels in two discrete fields (i.e., a squared difference accumulation). Encoder 12 at step 142 sets a first sd pointer to a field of a current frame and a second sd pointer a first field of a prior frame. Thereafter, at step 144 encoder 12 sets the first sd pointer and the second sd pointer to the first pixels on the current content lines of their respective fields.

At step 146, encoder 12 calculates a squared difference value by subtracting the luminance value from the pixel pointed to by the first sd pointer from the luminance value from the pixel pointed to by the second sd pointer and taking the square of the difference. Thereafter, encoder 12 adds the squared difference value to the matching property value at step 148.

At decision point 150, encoder 12 determines if there are more pixels on the current content lines. If yes, at step 152 encoder 12 advances the first and second sd pointers to the next pixels on the current lines and returns to step 146. If no, encoder 12 proceeds to decision point 154.

At decision point 154, encoder 12 determines whether there is another content line in each of the fields. If yes, encoder 12 advances the first and second sd pointers to the next content lines at step 156 and then returns to step 144. If no, encoder 12 stores the matching property value at step 155 and thereafter an implementation for calculating the matching property value of a current field is complete.

The foregoing is one embodiment for calculating a matching property value by accumulating the square of the difference between each of the plurality of pixels in a selected field for a frame from each of the plurality of pixels in the selected field of a prior frame. However, other methods of calculating a matching property value are contemplated.

Figure 12:
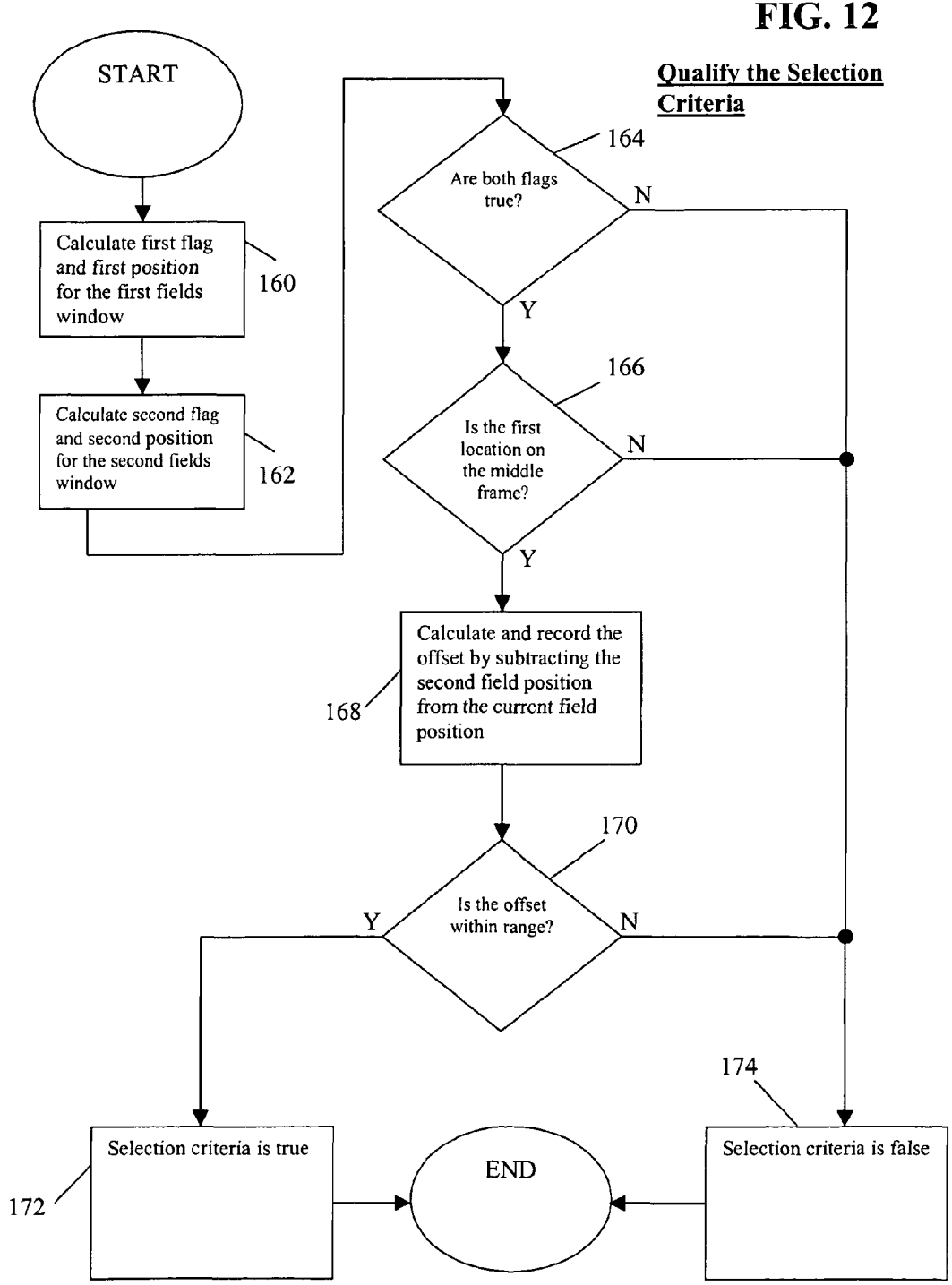
FIG. 12 is a flowchart of a method of qualifying the selection criteria.

Referring to FIG. 12, an implementation of qualifying the selection criteria is illustrated. In this implementation, a device (such as encoder 12, mark detector 13 or playback device 25) at step 160 calculates a first flag and first location for first fields window 102. Thereafter, the device calculates a second flag and second location for second fields window 104 at step 162. An implementation of calculating a flag and location is described in greater detail below.

After calculating the flags and locations, the device at decision point 164 determines whether the first flag and the second flag are both set to true. If no, the selection criteria are recorded as having not been met at step 174 and the method is complete. If yes, the device proceeds to decision point 166.

At decision point 166, the device determines whether the first location is an isolated frame which, in one embodiment, is middle frame 108. If no, the selection criteria are recorded as having not been met at step 174 and the method is complete. If yes, the device at step 168 calculates and records an offset by subtracting the second field position from the current field position.

The device at decision point 170 determines if the offset is within range, where the range in one embodiment is within one frame position from isolated frame position 108$k$ in either direction. If not within range, selection criteria is recorded as having not been met at step 174 and the method is complete. If within range, the device at step 172 selection criteria is recorded as having been met at step 174 and the method is complete.

While one embodiment contemplates the use of flags as a binary indicator, other embodiments that indicate multiple states are also contemplated.

The foregoing is one embodiment for qualifying a selection criteria by determining whether there is exactly one CMP frame in a frame subset (e.g., frame window 100), wherein the CMP frame is the only frame in each of the one or more frame subsets that has a change in the one or more measurable parameters that is greater than a selection threshold. However, other methods of qualifying a selection criteria are also contemplated.

In one embodiment, mark 20 is not modulated and detected every time a change in one or more measurable parameters is detected. Rather, reliability is not based on the number of times in which frames are modulated but rather on the ability to reliably locate instances when the frames of content signal 18 have been modulated.

Figure 13:
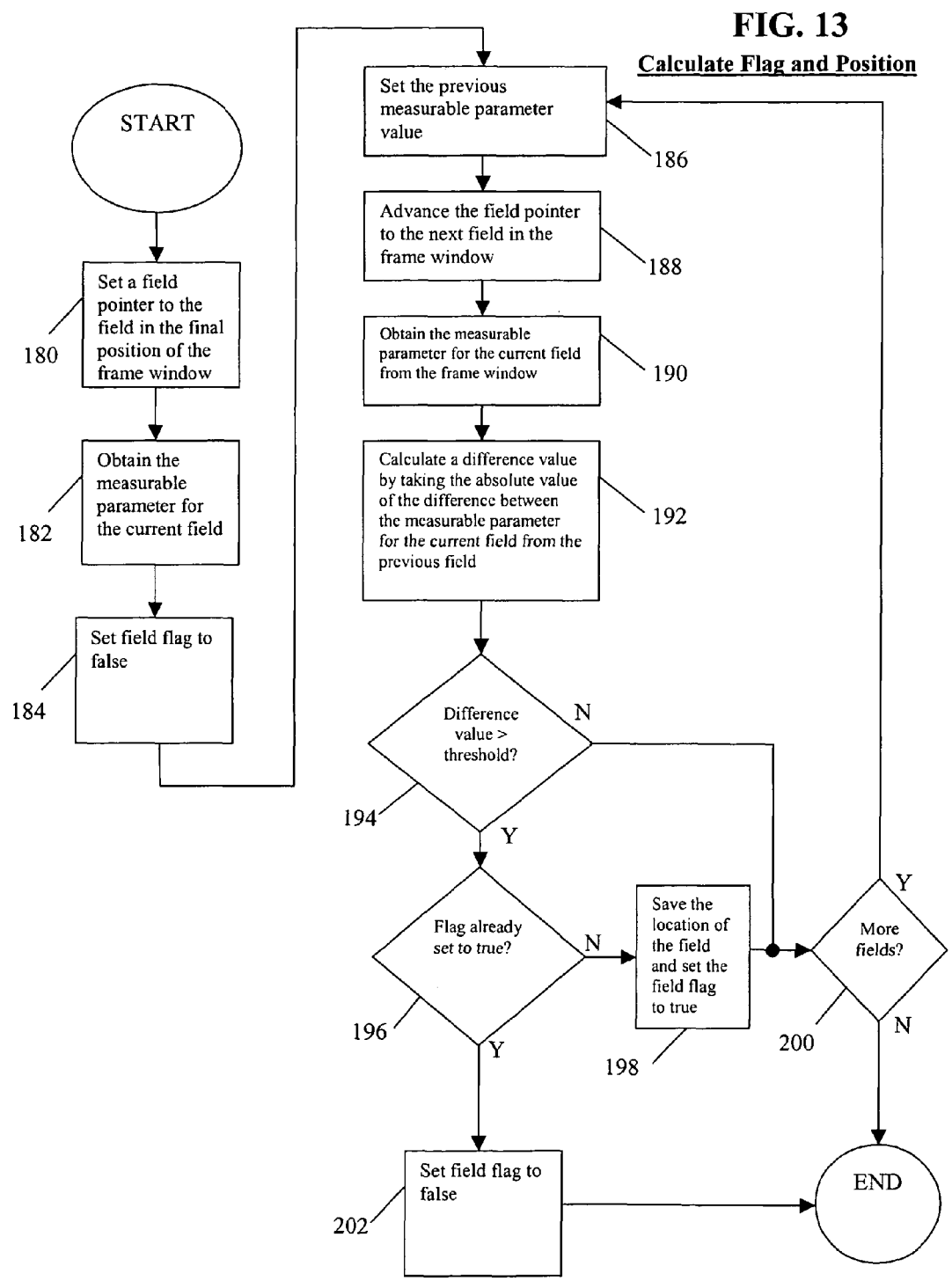
FIG. 13 is a flowchart of a method of calculating the flag and position.

Referring to FIG. 13, an implementation for calculating a flag and location first is illustrated. In this implementation, a device (such as encoder 12, mark detector 13 or playback device 25) at step 180 sets a field pointer to the selected field (i.e., first field or second field) of final frame position 108$a$. At step 182, the device sets a current measurable parameter comparison value to the previously stored measurable parameter value for the current field. Thereafter, the device sets the field flag to false at step 184.

At step 186, the device sets the previous measurable parameter comparison value to the current measurable parameter comparison value. Thereafter, the device at step 188 advances the field pointer to the next field in frame window 100. The device obtains the current measurable parameter comparison value by obtaining the measurable parameter for the current field at step 190.

The device at step 192 calculates a difference value by taking the absolute value of the difference between the current measurable parameter comparison value and the previous measurable parameter comparison value. At decision point 194, the device determines if the previously calculated difference value is greater than a change threshold, wherein the change threshold indicates that a significant change in measurable parameter has occurred in comparing one field to a corresponding field (e.g., an adjacent field). If the change is not significant, the device advances to decision point 200. If the change is significant, the device proceeds to decision point 196.

The device at decision point 196 determines whether the field flag is already set to true, thereby indicating that a significant change in measurable parameter has already been located in frame window 100. If yes, the device at step 202 sets the field flag to false and completes one implementation for calculating a flag and location because more than one comparison has identified a significant change in measurable parameter in frame window 100. If no, the device at step 198 saves the location of the current field and sets the field flag to true.

At decision point 200, the device determines if more fields are present in the present fields window of frame window 104. If yes, the device returns to step 186. If no, one embodiment for calculating a flag and location is complete.

Figure 14:
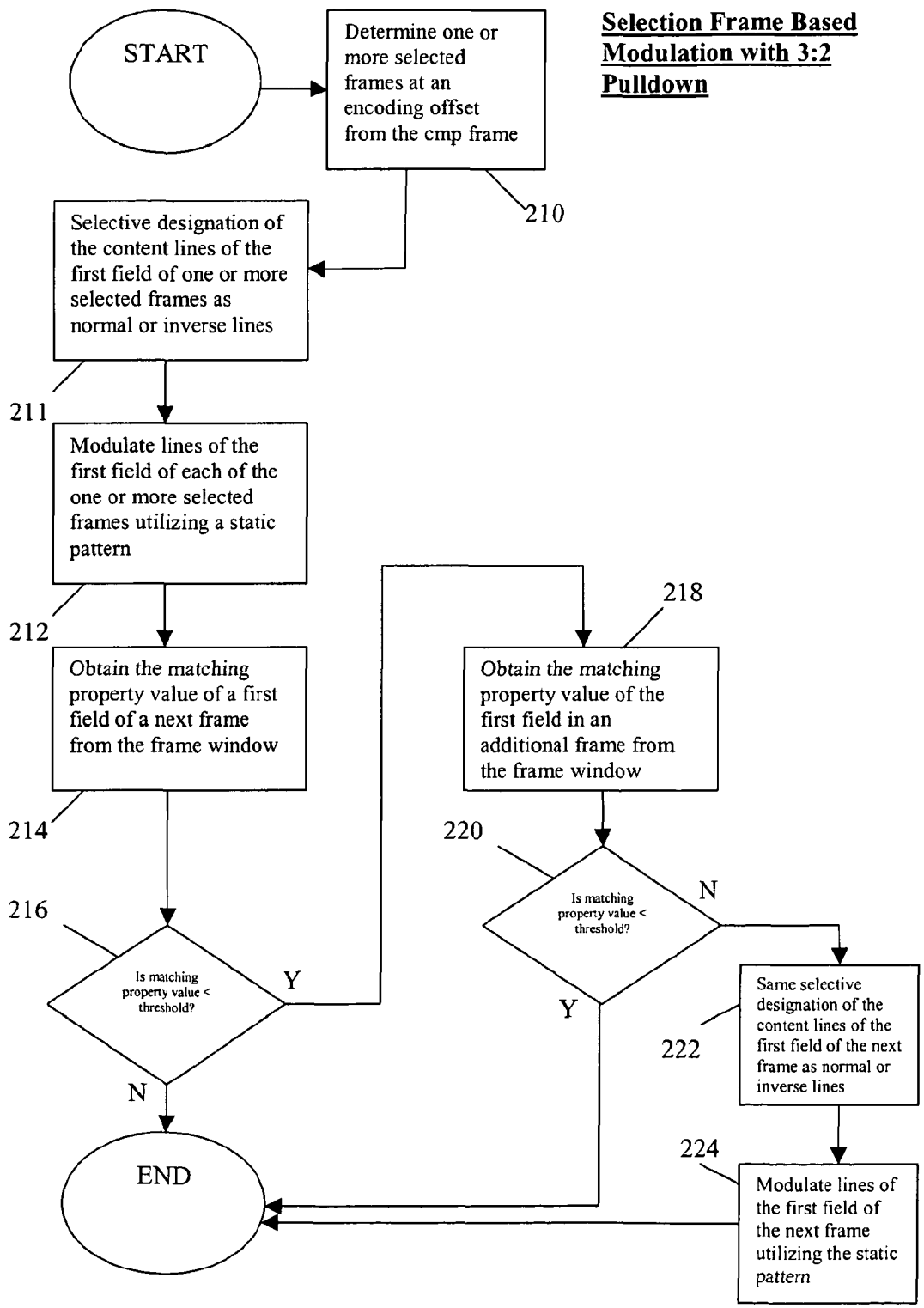
FIG. 14 is a flowchart of a method of selection frame based modulation with 3:2 pulldown.

Referring to FIG. 14, an implementation of a method for selection frame based modulation with 3:2 pulldown consideration is shown. In this implementation, the method first includes a step 210 wherein encoder 12 calculates the position of one or more selected frames that may be modulated based on an encoding offset from the CMP frame. In one embodiment, only one of the one or more selected frames is designated for modulation and it is at an encoding offset of zero, thus designating the CMP frame (e.g., middle frame 108 of frame window 100) as the one or more selected frames. However, in another embodiment, other encoding offsets are contemplated when both encoder 12 and mark detector 13 recognize that they are analyzing similar frames.

Encoder 12 at step 211 selectively designates the content lines of the first field of the one or more selected frames as normal or inverse content lines, wherein the normal content lines are modulated by a static pattern (as explained in greater detail below) and inverse content lines are modulated by the inverse of the static pattern. The designation of content lines as normal or inverse may vary based on desired embodiments or within embodiments, but the field being designated needs to have a sufficient number of normal to inverse and inverse to normal transitions to allow mark 20 to be detected and to meet a minimal level of robustness.

In one embodiment, the content lines of the field are designated in a pattern of one normal content line, one inverse content line, two normal content lines, two inverse content lines repeating throughout the field. Thereafter, encoder 12 modulates the content lines of the first field of the one or more selected frames utilizing a static pattern at step 212 as described in greater detail below. Encoder 12 then at step 214 reads the matching property value of a first field of a subsequent frame (e.g., in one embodiment frame position 108*l*) in first fields window 102 into a squared difference accumulation value.

Encoder 12 at decision point 216 determines whether the matching property value of the subsequent frame is less than a threshold. If no, a method of selection frame based modulation with 3:2 pulldown consideration is complete. If yes, encoder 12 reads the matching property value of a first field of an additional frame (i.e., frame position 108*m*) in first fields window 102 into the matching property value at step 218.

At decision point 220, encoder 12 determines whether the matching property value of the additional frame is less than a threshold. If yes, a method of selection frame based encoding with 3:2 pulldown consideration is complete. If no, encoder 12 at step 222 designates the content lines of the first field of the subsequent frame (e.g., frame position 108*l* of frame window 100) as normal or inverse lines in the same designation as previously performed at step 210. Thereafter, encoder 12 modulates the content lines of the first field of subsequent frame position 108*l* utilizing the static pattern at step 224. Thereafter, one implementation of a method of selection frame based modulation with 3:2 pulldown consideration is complete.

In another embodiment, the foregoing method may be limited to steps 210, 211 and 212 and that, in such an embodiment, the method may still be functional but may not identify every field that should be, has been or should have been modulated. In another embodiment, the foregoing method may be altered when content signal 18 is not in NTSC format to provide for content signal 18 in an alternate format.

The subsequent frame, if modulated, in one embodiment has the same designation as the one or more selected frames. However, in another embodiment each instance of one or more selected frames may have a different designation pattern so long as the subsequent frame, when modulated, has the same designation pattern as the preceding one or more selected frames.

In one embodiment, the use of the term "subsequent frame" means the frame in the content signal immediately after the last selected frame that is used during the 3:2 pulldown comparison and the use of the term "additional frame" means the frame in the content signal immediately after the subsequent frame and is used during the 3:2 pulldown comparison.

Figure 15:
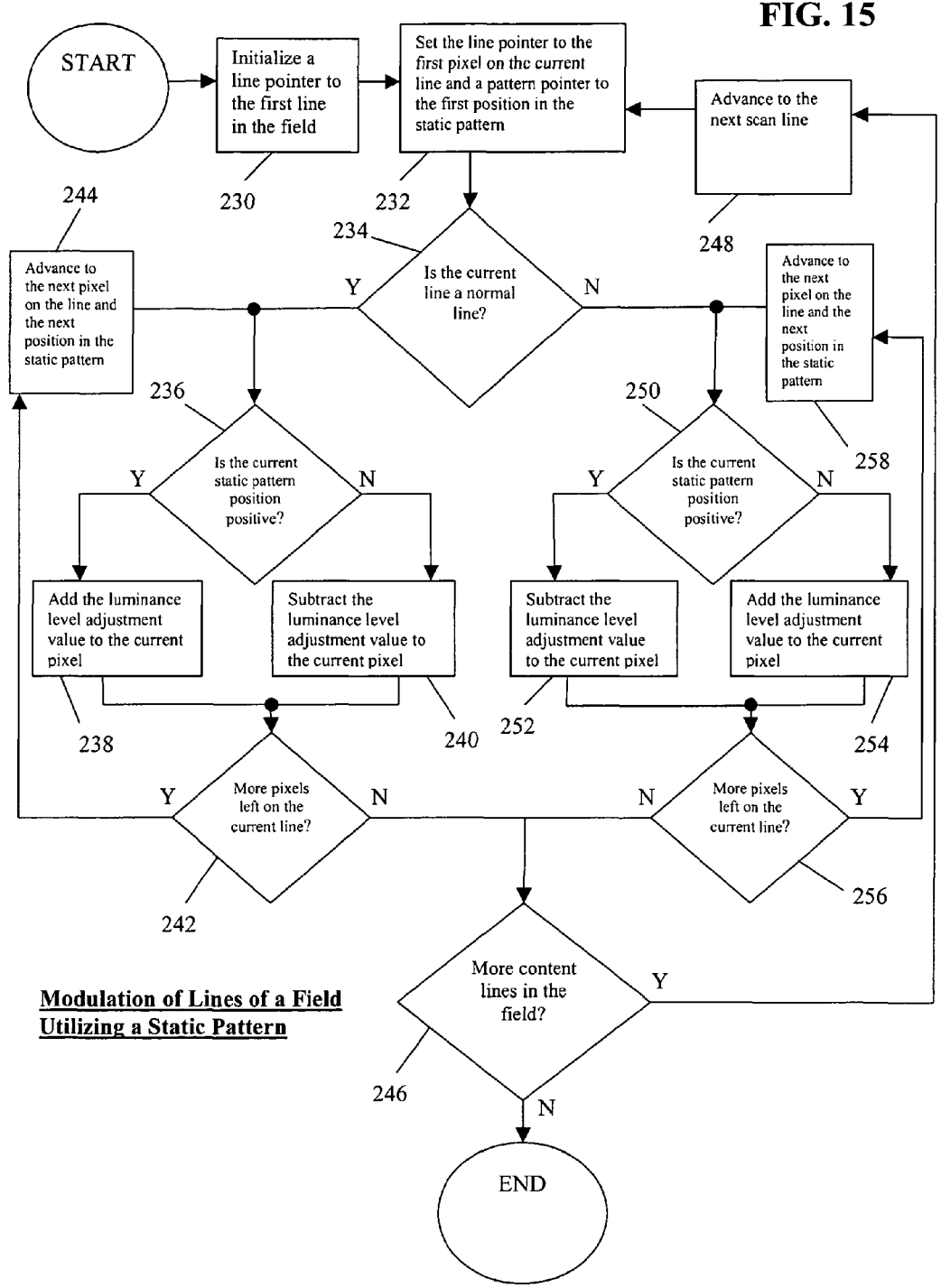
FIG. 15 is a flowchart of a method of modulating the lines of a field utilizing a static pattern.

Referring to FIG. 15, an implementation of a method of modulating a current field of content signal 18 utilizing a static pattern is illustrated. In this implementation, the method first includes a step 230 where encoder 12 (or playback device 25) initializes a line pointer to the first content line of content signal 18. Thereafter, encoder 12 at step 232 sets the line pointer to the first pixel on the current content line and a pattern pointer to the first position in a static pattern. The static pattern in one embodiment is a single array of positions that is the same length as a content line of content signal 18, but the size of the array may be adjusted by the offset of where encoding and/or detecting on a content line begins and ends. The static pattern in one embodiment does not indicate a magnitude of adjustment, but rather indicates the polarity of adjustments such as whether the luminance level adjustment when made should be added to (i.e., positive) or subtracted from (i.e., negative) the luminance level for each of the pixels of a content line. In one embodiment, the static pattern is a bit pattern where a bit of 0 indicates a negative luminance level adjustment and a bit of 1 indicates a positive luminance level adjustment. However, other alternative embodiments of static pattern are contemplated. In addition, in one embodiment the static pattern need not be the same length as a content line of content signal 18, but rather can be shorter by having multiple readings at one or more positions of the static pattern or with techniques such as run length encoding.

In another embodiment, the static pattern is a gramelchupp static pattern, where the gramelchupp static pattern is for a standard definition NTSC 720 pixels per line (i) starts 8 pixels from the beginning of the line, (ii) ends 8 pixels from the end of the line, and (iii) divides the remaining 704 pixels into 22 equal size portions of 32 pixels each, and (iv) designates the polarity for each portion according to the following list [−1, 1, −1, 1, −1, 1, −1, −1, 1, −1, 1, −1, 1, −1, 1, 1, −1, 1, −1, 1, −1, 1]. Other configurations of the gramelchupp static pattern is also contemplated.

At decision point 234, encoder 12 determines whether the current content line is a normal line or an inverse line, the selection of which was previously designated. If the content line is a normal line, encoder 12 proceeds to decision point 236 to determine if the current position (or reading) of the static pattern is positive or negative. If the current position is positive, encoder 12 adds the luminance level adjustment value to the current pixel of the normal line at step 238, of which the one embodiment that includes optional range checking is described below. If the current position is negative, encoder 12 subtracts the luminance level adjustment value from the current pixel of the normal line at step 240, of which one implementation of the method that includes optional range checking is described below. After completion of step 238 or step 240, encoder 12 at decision point 242 determines whether there is another pixel remaining on the current content line. If yes, encoder 12 advances the line pointer to the next pixel on the normal line and the pattern pointer to the next position (or reading at the current position) at step 244 and returns to decision point 236. If no, encoder 12 proceeds to decision point 246.

If at decision point 234 the content line is an inverse line, encoder 12 proceeds to decision point 250 to determine if the current position (or reading) of the static pattern is positive or negative. If the current position is positive, encoder 12 subtracts the luminance level adjustment value from the current pixel of the inverse line at step 252. If the current position is negative, encoder 12 adds a luminance level adjustment value to the current pixel of the inverse line at step 254. After completion of step 252 or step 254, encoder 12 at decision point 256 determines whether there are pixels remaining on the current content line. If yes, encoder 12 advances the line pointer to the next pixel on the inverse line and the pattern pointer to the next position (or reading at the current position) at step 258 and returns to decision point 250. If no, encoder 12 proceeds to decision point 246.

At decision point 246, encoder 12 determines whether there are content lines remaining in the current field. If yes, encoder 12 advances the line pointer to the next content line at step 248 and returns to step 232. If no, a method for modulating a current field of content signal 18 with a static pattern is complete.

Figure 16:
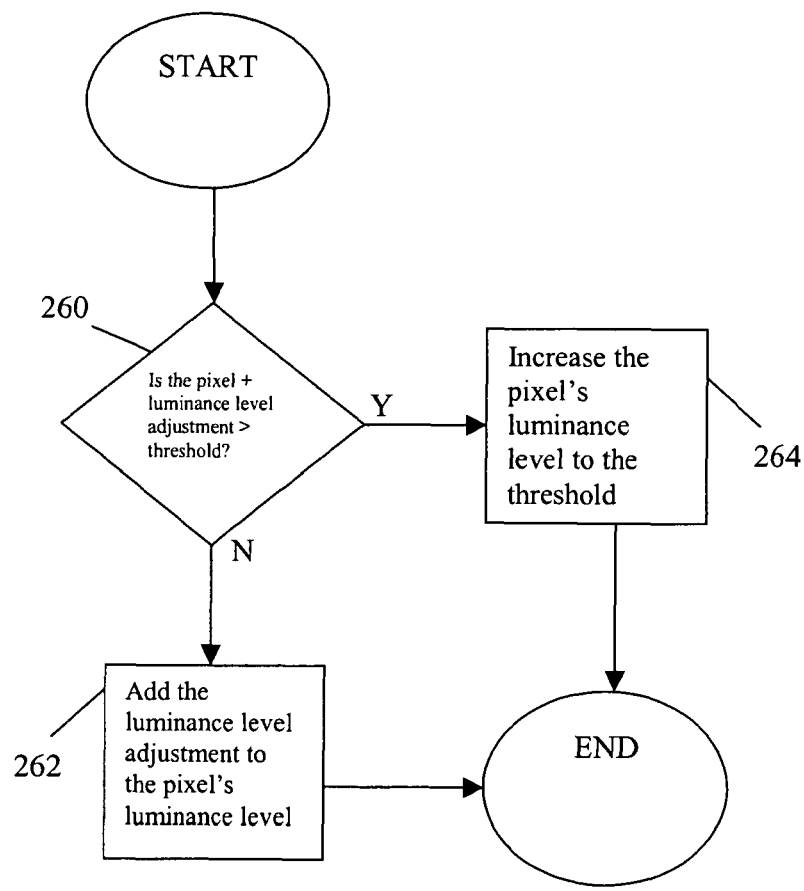
FIG. 16 is a flowchart of a method of adding the luminance level adjustment.

Referring to FIG. 16, an implementation of a method for adding luminance level adjustment is illustrated. In this implementation, the method utilizes range checking and includes a decision point 260 where encoder 12 (or playback device 25) determines whether the luminance of the pixel plus the luminance level adjustment is greater than a maximum luminance level threshold, wherein the maximum luminance level threshold represents a maximum luminance level value that renders the luminance of the pixel too bright or otherwise out of range. If yes, encoder 12 increases the luminance of the pixel to the maximum luminance level threshold at step 264. If no, encoder 12 at step 262 adds the luminance level adjustment to the luminance of the pixel. Upon completion of step 262 or step 264, a method for adding luminance level adjustment is complete.

Figure 17:
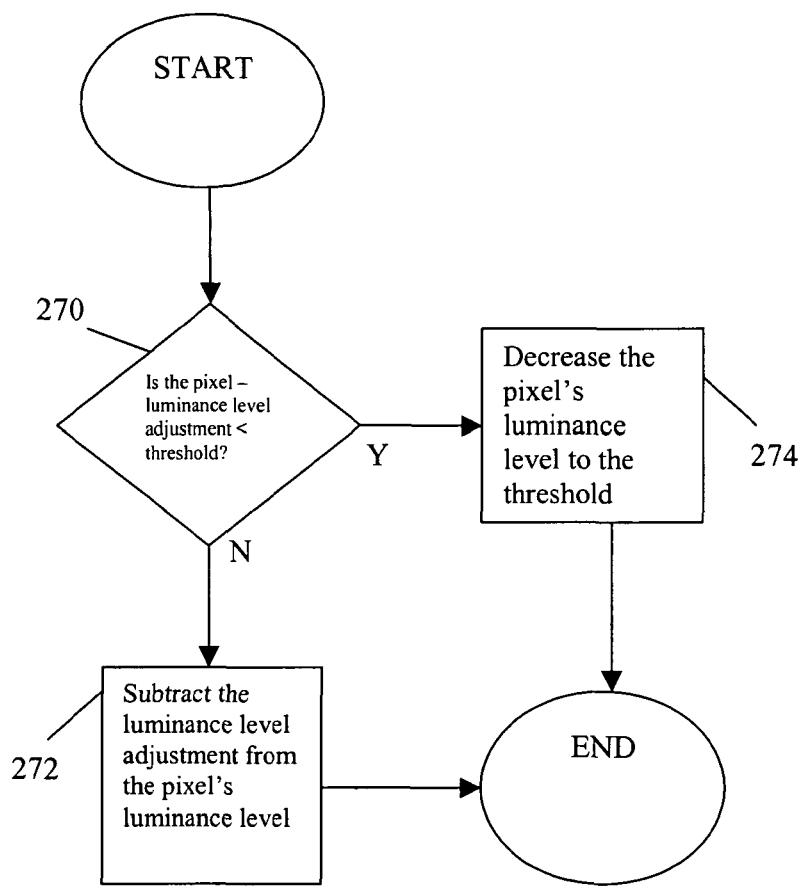
FIG. 17 is a flowchart of a method of subtracting the luminance level adjustment.

Referring to FIG. 17, an implementation of a method for subtracting luminance level adjustment is illustrated. In this implementation, the method utilizes range checking and includes a decision point 270 wherein encoder 12 (or playback device 25) determines whether the luminance of the pixel minus the luminance level adjustment is less than a minimum luminance level threshold, where the minimum luminance level threshold represents a minimum luminance level value that renders the luminance of the pixel too dark or otherwise out of range. If yes, encoder 12 decreases the luminance of the pixel to the minimum luminance level threshold at step 274. If no, encoder 12 at step 272 subtracts the luminance level adjustment from the luminance of the pixel at step 272. Upon completion of step 272 or step 274, a method for subtracting luminance level adjustment is complete.

Figure 18:
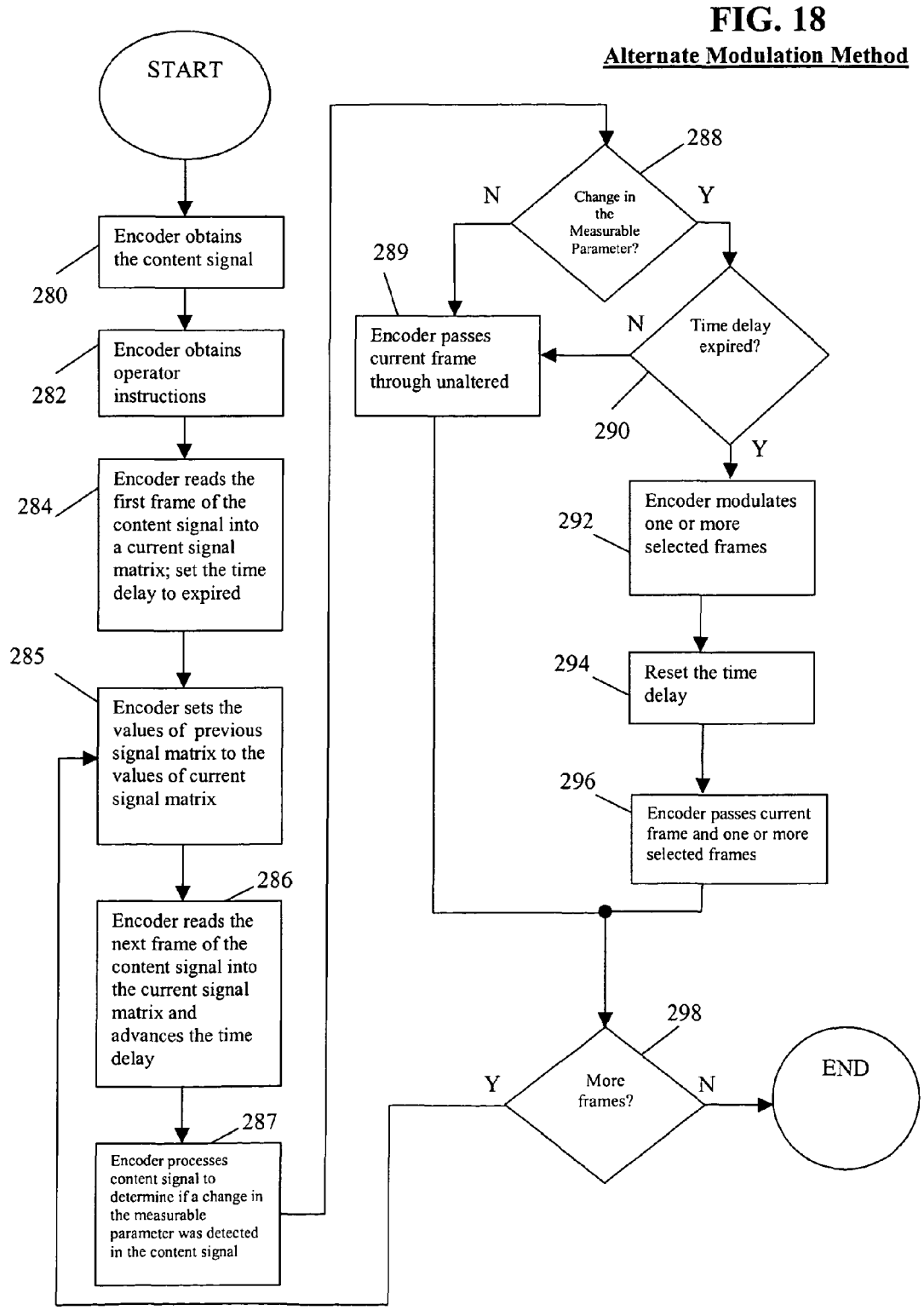
FIG. 18 is an alternate modulation method.

Referring to FIG. 18, an alternate method for modulating mark 20 within content signal 18 first includes a step 280 where encoder 12 obtains content signal 18 from signal source 10. Thereafter, encoder 12 at step 282 obtains instructions from operator 16 through operator interface 38.

Encoder 12 at step 284 reads the first frame of content signal 18 into a current signal matrix and sets the time delay to expired, wherein the value indicating expired is a value that signifies that the next set of one or more selected frames that is identified may be encoded. In one embodiment, the signal matrix is a frame storage, but other temporary storage devices are contemplated. The current signal matrix stores the luminance values of the current frame of content signal 18 in a matrix format where the positions of the matrix correspond to the pixels of content signal 18, while the chrominance values are retained in storage 40. Thereafter, encoder 12 at step 285 sets the values of a previous signal matrix to the values of the current signal matrix, such that the previous signal matrix represents a prior frame of content signal 18 and the current signal matrix represents a current frame of content signal 18.

At step 286, encoder 12 reads another frame of content signal 18 into the current signal matrix and advances the time delay unless the time delay is already set to expiration. In one embodiment, such frame of content signal 18 is a next adjoining frame in content signal 18, however in an alternate embodiment encoder 12 may utilize an alternate frame for comparison such as a nearby frame.

In one embodiment, the time delay is a value used that prevents encoder 12 from modulating mark 20 within content signal 18 at every change in one or more measurable parameters because modulating a frame after every change in one or more measurable parameters may make the presence of mark 20 more visible to the user. Thus, by advancing the time delay until expiration ensures that a sufficient number of frames have been read by encoder 12 since the last change in one or more measurable parameters. In one embodiment, the time delay may involve detection of a change in one or more measurable parameters including a predetermined number or a random number, a specific amount of time, and the like.

Encoder 12 at step 287 processes content signal 18 to determine if a change in the one or more measurable parameters is observed in content signal 18 at the current frame.

After analyzing content signal 18 to determine if a change in one or more measurable parameters was observed, encoder 12 at decision point 288 determines the action that should be taken if a change in one or more measurable parameters was detected. If no change in one or more measurable parameters was detected, encoder 12 proceeds to step 289 and permits the current frame of content signal 18 to pass through encoder 12 to broadcast source 14 unaltered. If a change in one or more measurable parameters is detected, encoder 12 proceeds to decision point 290 for further processing.

Before potentially modulating content signal 18, encoder 12 at decision point 290 determines whether the time delay has expired. Expiration of the time delay ensures that a sufficient delay has occurred since the previous modulation of one or more selected frames to prevent visible alterations in the picture of content signal 18 as a result of modulating frames too close to one another. If the time delay has not expired, encoder 12 at step 289 passes the frame through unaltered to broadcast source 14 as a nearby frame had been modulated.

If the time delay has expired, encoder 12 proceeds from decision point 290 to step 292 to act as the current frame is a CMP frame by modulating one or more selected frames of content signal 18. Encoder 12 resets the time delay at step 294 to prevent a nearby frame with a change in one or more measurable parameters from being modulated. Thereafter, encoder 12 passes the current frame and one or more selected frames of content signal 18 to broadcast source 14.

Upon completion of step 289 or step 296, encoder 12 at decision point 298 determines whether there is another frame to analyze from content signal 18. If there are frames remaining, encoder 12 returns to step 285. If there are no frames remaining in content signal 18, the alternate method of modulating is complete.

The use of a matrix during the alternate modulating and detecting method analysis is one embodiment for a method of storing frames during the alternate method of modulation, but that other methods of analyzing frames are also contemplated.

Referring back to FIGS. 3 and 5, mark 20 is in one embodiment detected within modulated content signal 22 by use of mark detector 13. In general, one embodiment detects mark 20 within content signal 18 (i.e., modulated content signal 22) by identifying a plurality of one or more selected frames that that would have been selected by encoder 12 from among the plurality of frames of content signal 18 and processing the plurality of one or more selected frames to determine if mark 20 is present within content signal 18 (i.e., such that if mark 20 is found content signal 18 is modulated content signal 22). In addition, one implementation also outputs a detection of mark 20 when processing the plurality of one or more selected frames determines that mark 20 is present within modulated content signal 22.

Figure 19:
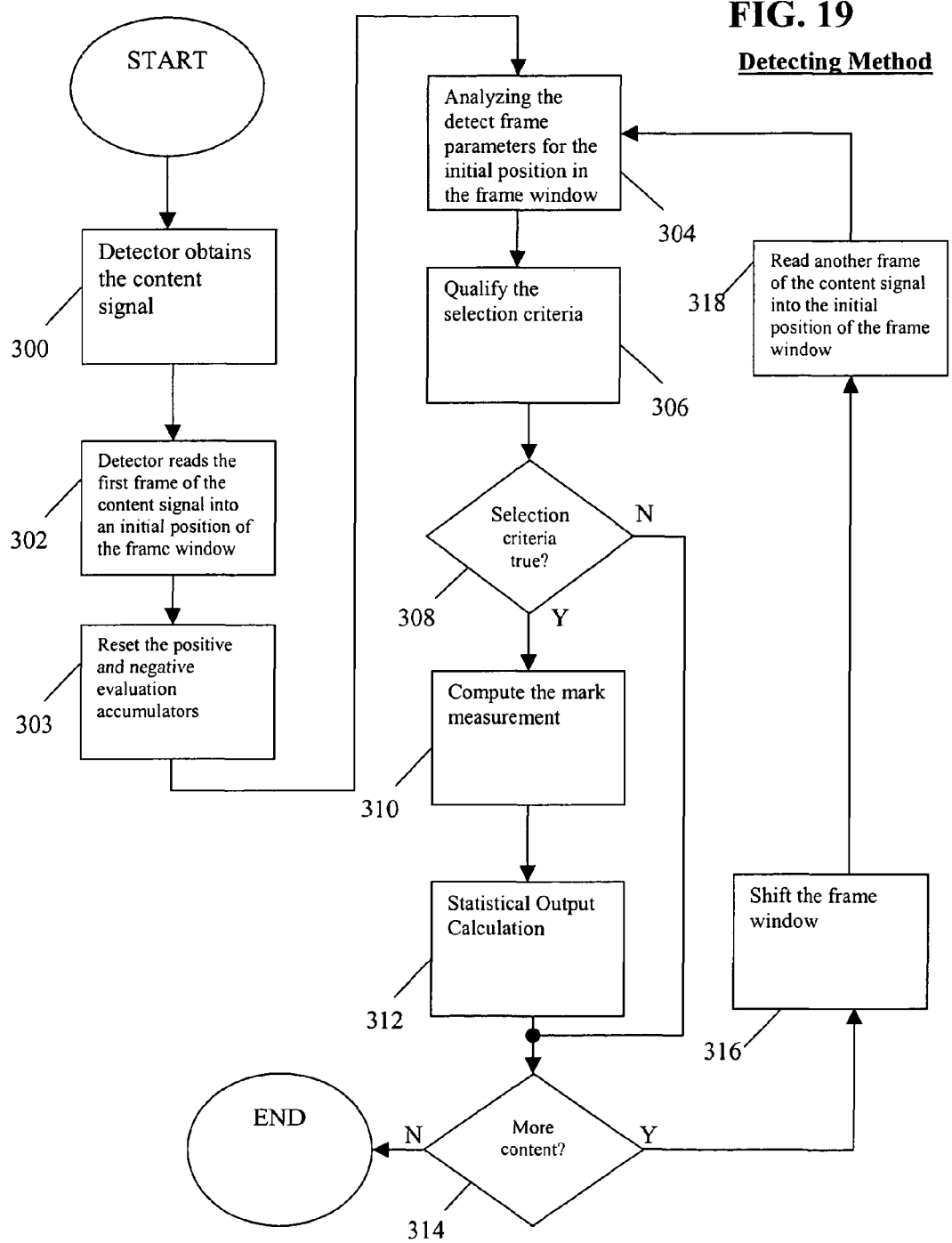
FIG. 19 is a detecting method.

Referring to FIG. 19, an implementation for a method of detecting the presence of mark 20 in modulated content signal 22 is illustrated. In this implementation, the method includes a first step 300 where mark detector 13 (or playback device 25) obtains modulated content signal 22 from broadcast source 14. Mark detector 13 reads a first frame of content signal 18 into initial frame position 108*u* of frame window 100 at step 302. Thereafter, mark detector 13 at step 303 resets a positive evaluation accumulator and a negative evaluation accumulator, the use of which is described in greater detail below.

Mark detector 13 analyzes the detect frame parameters for initial frame position 108u at step 304, a method of which is described in greater detail below. In addition, mark detector 13 may optionally discard the current frame of content signal 18 after it has completed its analysis. Thereafter, mark detector 13 at step 306 qualifies the selection criteria, one embodiment of which is described above. In one embodiment, the method requires that the identical or nearly identical method used to qualify the selection criteria during modulation is also used during detecting, or at least the methods must provide substantially same results so as to locate the same frame that was used as a base for modulation (e.g., the CMP frame).

At decision point 308, mark detector 13 determines whether the selection criteria is met. If no, mark detector 13 advances to decision point 314. If yes, mark detector 13 at step 310 computes the mark measurement, one implementation of which is described in greater detail below. Upon completion of step 310, mark detector 13 performs a statistical output calculation at step 312, of which an implementation of the method is also described in greater detail below.

Mark detector 13 at decision point 314 determines whether there is another frame in content signal 18. If yes, mark detector 13 at step 316 shifts the frame window and at step 318 reads another frame of content signal 18 into the initial frame 108u before returning to step 304. If no, a detecting method is complete.

In one embodiment, mark detector 13 at step 316 may output or discard frames of modulated content signal 22 depending on the embodiment of recording system 25.

Figure 20:
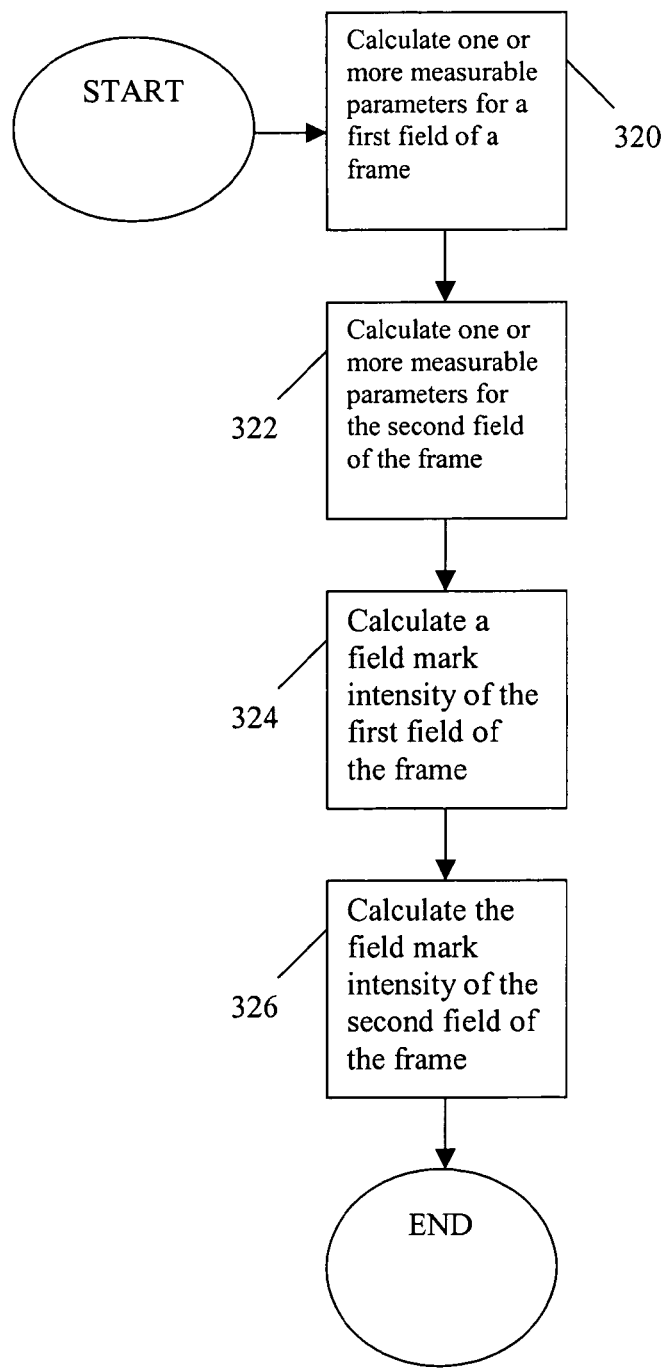
FIG. 20 is a method of analyzing the detect frame parameters.

Referring to FIG. 20, an implementation for method a method of analyzing the detect frame parameters is illustrated. In this implementation, the method first includes mark detector 13 (or playback device 25) at step 320 calculating one or more measurable parameters for a first field of a frame of modulated content signal 22. Thereafter, mark detector 13 calculates the one or more measurable parameters for a second field of the frame of modulated content signal 22. One implementation for the method for calculating one or more measurable parameters for a field is described in greater detail above.

Mark detector 13 at step 324 calculates a field mark intensity of the first field of the frame, one implementation of the method of which is described in greater detail below. Thereafter, mark detector 13 calculates the field mark intensity of the second field of the frame at step 326. Steps 320, 322, 324 and 326 may occur in any order. Upon completion of step 326, a method of analyzing the detect frame parameters is complete.

Figure 21:
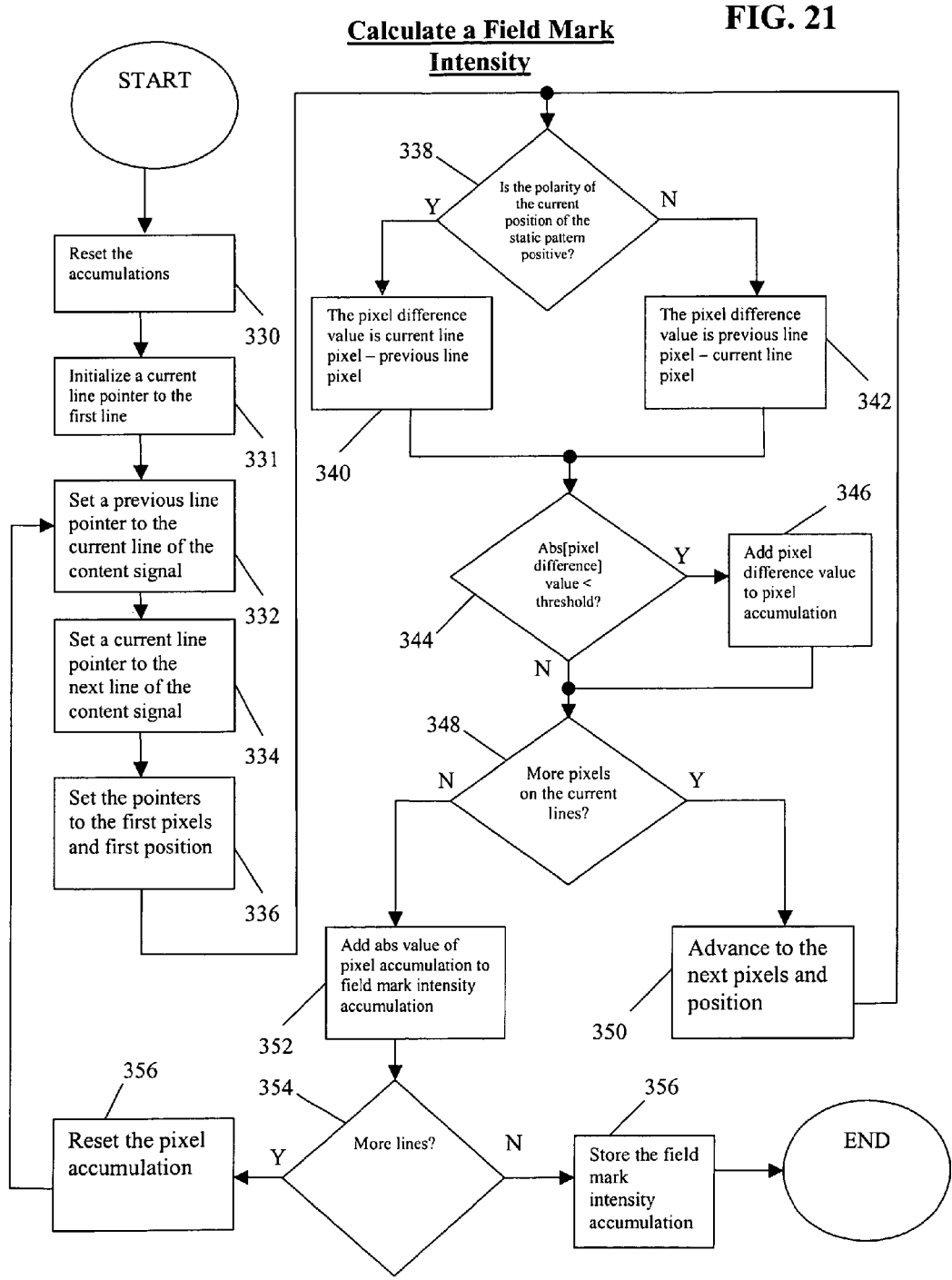
FIG. 21 is a method of calculating the field mark intensity.

Referring to FIG. 21, an implementation for a method for determining a field mark intensity is illustrated. In this implementation, the method first includes mark detector 13 (or playback device 25) at step 330 resetting a pixel accumulation and a field mark intensity accumulation. Mark detector 13 at step 331 then initializes a current line pointer to the first content line of the current field. Thereafter, mark detector 13 sets a previous line pointer to the current line of modulated content signal 22 at step 332.

At step 334, mark detector 13 sets the current line pointer to the next line of modulated content signal 22. Thereafter, mark detector 13 at step 336 sets the current line pointer and the previous line pointer to the first pixels of their respective content lines and the pattern pointer to the first position in the static pattern.

Mark detector 13 at decision point 338 determines the calculation it should make based on whether the polarity of the current position of the static pattern is positive or negative, as the static pattern used by mark detector 13 is the same as the static pattern used by encoder 12 during the encoding method. If the polarity of the current position (or reading) in the static pattern is positive, mark detector 13 at step 340 calculates a pixel difference value by subtracting the previous line pixel from the current line pixel. If the polarity is negative, mark detector 13 at step 342 calculates a pixel difference value by subtracting current line pixel from the previous line pixel.

Upon completion of step 340 or step 342, mark detector 13 at decision point 344 determines if the absolute value of the pixel difference is less than a threshold, wherein the threshold indicates that the level of pixel difference is from content instead of modulation. If yes, mark detector 13 adds the pixel difference value to a pixel accumulation at step 346 and proceeds to decision point 348. If no, mark detector 13 does not use the pixel difference value and proceeds to decision point 348.

Mark detector 13 determines at decision point 348 whether there are additional pixels on the current content lines. If yes, mark detector 13 advances the current line pointer, previous line pointer and pattern pointer to the next pixels and position at step 350 and returns to decision point 338. If no, mark detector 13 at step 352 adds the absolute value of the pixel accumulation to the field accumulation and proceeds to decision point 354.

At decision point 354, mark detector 13 determines whether additional content lines remain in the current field. If yes, mark detector 13 at step 356 resets the pixel accumulation and returns to step 332. If no, a method for calculating a field mark intensity is complete.

Figure 22:
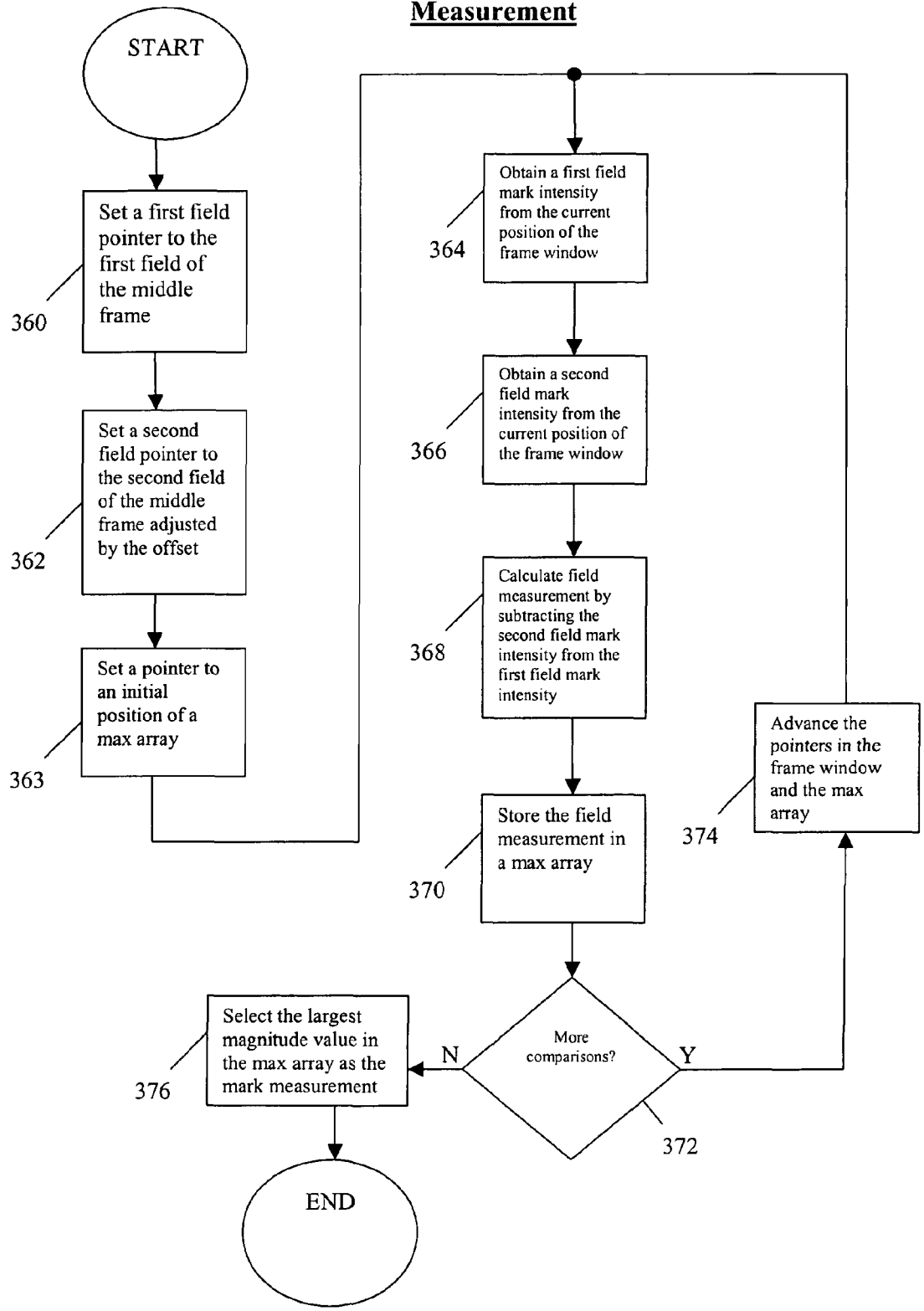
FIG. 22 is a method of computing the mark measurement.

Referring to FIG. 22, an implementation for a method for computing a mark measurement is illustrated. In this implementation, the method first includes mark detector 13 (or playback device 25) setting a first field pointer to the first field of middle frame 108 at step 360. Mark detector 13 at step 362 then sets a second field pointer to a second field adjusted from the isolated frame by the previously calculated offset. Thereafter, mark detector 13 sets a max pointer to an initial position of a max array at step 363. Other methods for calculating the maximum value are contemplated even if a max array is not used in other implementations.

Mark detector 13 at step 364 obtains a first mark luminance level for the field being pointed to by first field pointer. Mark detector 13 obtains a second mark luminance level for the field being pointed to by second field pointer. Thereafter, mark detector 13 calculates a field measurement by subtracting the second mark luminance level from the first mark luminance level at step 368. The field measurement is stored by mark detector 13 in the current position of the max array at step 370.

Mark detector 13 at decision point 372 determines if there are more comparisons. If yes, mark detector 13 advances the pointers in frame window 100 and the max array and returns to step 364. If no, mark detector 13 selects the largest magnitude value in the max array as the mark measurement at step 376. Upon completion of step 376, a method of computing the mark measurement is complete.

In other embodiments where there is more than one selected frame at an offset from the CMP frame, all of the selected frames may be analyzed in addition to a few additional frames to perform the foregoing calculation.

Figure 23A:
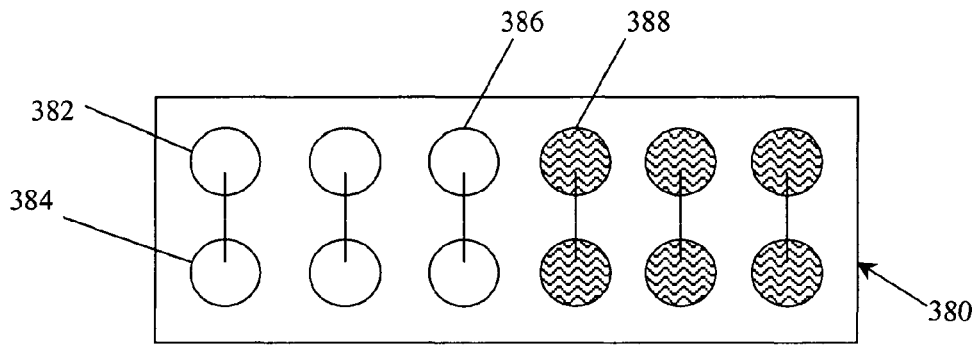
FIG. 23A is a simplified block illustration of a first series of frames.

Referring to FIG. 23A, an embodiment of a no adjustment comparison window 380 is illustrated. In this embodiment, no adjustment comparison window 380 includes a plurality of first fields 382 and a plurality of second fields 384. Type one fields 386 are of a first type and type two fields 388 are of a second type, wherein a comparison between a type one field 386 and a type two field 388 will reveal a significant change in one or more measurable parameters. As shown, comparisons performed in no adjustment comparison window 380 are compared with other field the frame such that there is no offset.

Figure 23B:
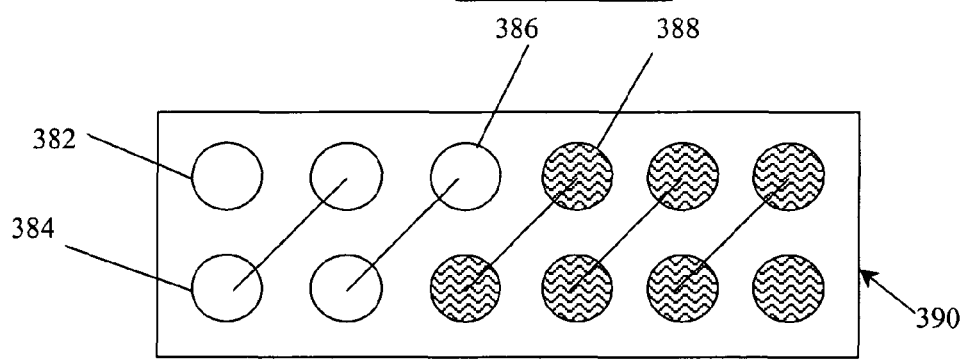
FIG. 23B is a simplified block illustration of a second series of frames.

Referring to FIG. 23B, an embodiment of a negative one adjustment comparison window 390 is illustrated. In this embodiment, negative one adjustment comparison window 390 includes a plurality of first fields 382 and a plurality of second fields 384. As shown, comparisons of first fields 382 are performed in negative one adjustment comparison window 390 as compared against second fields 384 offset by negative one in second fields 384.

Figure 23C:
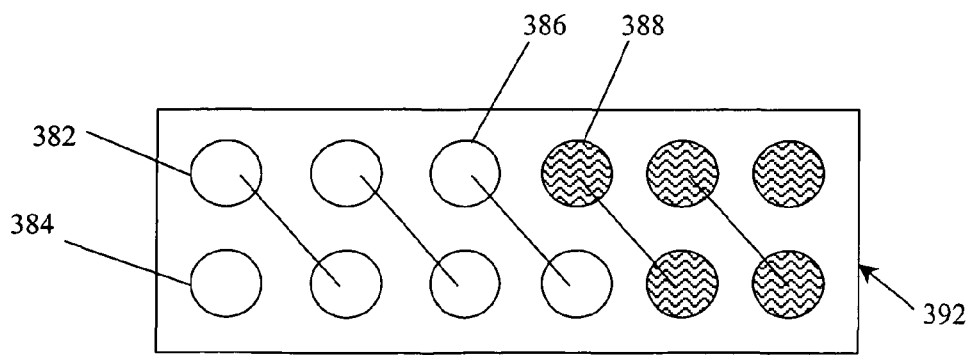
FIG. 23C is a simplified block illustration of a third series of frames.

Referring to FIG. 23C, an embodiment of a positive one adjustment comparison window 392 is illustrated. In this embodiment, a positive one adjustment comparison window 392 includes a plurality of first fields 382 and a plurality of second fields 384. As shown, comparisons of first fields 382 performed in positive one adjustment comparison window 392 as compared against second fields 384 offset by positive one in second fields 384.

Referring to FIG. 24, an implementation of a positive calculation matrix 450 is illustrated. In this implementation, positive calculation matrix 450 includes a range column 452 and a weighed mark value column 454. The range column in one embodiment contains a first positive range value 456, a second positive range 460, a third positive range 464 and a fourth positive range 468, wherein each range value indicates the maximum value that may be compared against range column 452 to obtain a corresponding value in weighted mark value column 454.

As shown, weighted mark value column 454 has an equal number of rows to range column 452. Weighted mark value column 454 includes a first positive weighed mark value 458, a second positive weighed mark value 462, a third positive weighed mark value 466 and a fourth positive weighed mark value 470. The values associated with the weighted mark value column 454 provide a statistical weight based on a comparison of a mark measurement against the maximum values contained in the range column 452.

Referring to FIG. 25, an implementation of a negative calculation matrix 500 is illustrated. In this implementation, negative calculation matrix 500 includes a range column 452 and weighed mark value column 454. Range column 452 in the exemplary embodiment of negative calculation matrix 500 includes a first negative range value 506, a second negative range 510, a third negative range 514 and a fourth negative range 518, wherein each range value indicates the greatest magnitude negative value that may be compared against the chart to obtaining a corresponding value in weighted mark value column 454. In one embodiment, the magnitude of the values of range column 452 of negative calculation matrix 500 are the same as positive calculation matrix 450.

Weighted mark value column 454 has an equal number of rows to upper range column 452. Weighted mark value column 454 includes a first negative weighed mark value 508, a second negative weighed mark value 512, a third negative weighed mark value 516 and a fourth negative weighed mark value 520. In one embodiment, the values of weighted mark value column 454 of negative calculation matrix 500 are the same as positive calculation matrix 450.

FIGS. 24 and 25 are shown with the number of rows and associated values reflecting one embodiment for a NTSC 10-bit Y Cr Cb video system. However, the number of rows and associated values of range column 452 and weighted mark value column 454 may vary based on the particular embodiment of recording system 25. The specific values used for fourth positive range 488 fourth negative range 518 may be based on the particular embodiment of recording system 25 and the number of bits used in the system.

Figure 26:
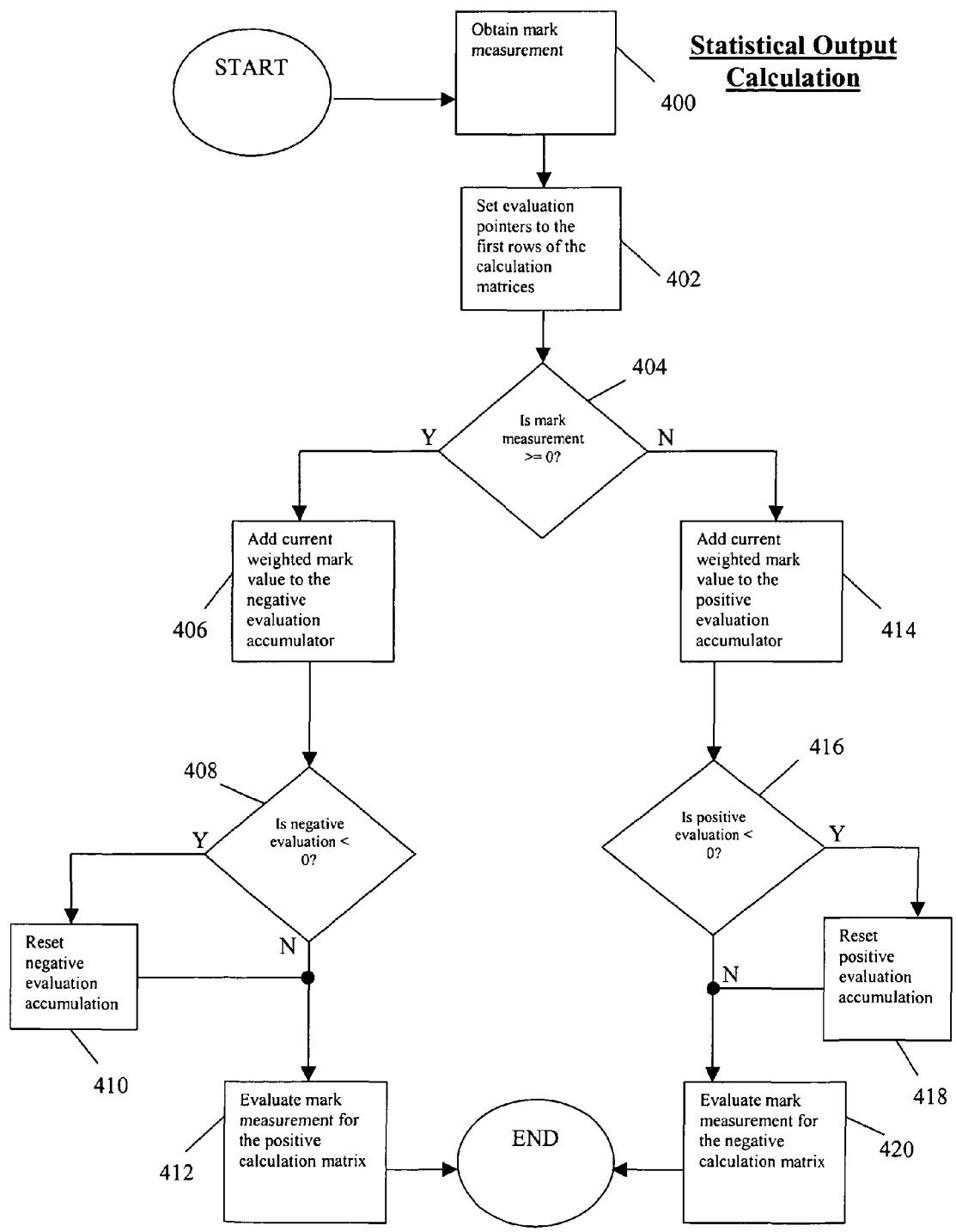
FIG. 26 is a flowchart of a statistical output calculation.

Referring to FIG. 26, an implementation of a method of statistical output calculation is illustrated. In this implementation, the method first includes a step 400 wherein mark detector 13 (or playback device 25) obtains the previously calculated mark measurement. At step 402, mark detector 13 sets a negative evaluation pointer to first negative range value 506 of negative calculation matrix 500 and a positive evaluation pointer to first positive range value 456 of positive calculation matrix 450. Thereafter, mark detector 13 determines if the mark measurement is greater than or equal to zero at decision point 404.

If the mark measurement is greater than or equal to zero at decision point 404, mark detector 13 proceeds to add the current weighted mark value pointed to by the negative evaluation pointer to a negative evaluation accumulator at step 406. Thereafter, mark detector 13 determines if the negative evaluation is less than zero. If no, mark detector 13 proceeds directly to step 412. If yes, mark detector 13 resets the negative evaluation accumulator at step 410. Thereafter, mark detector 13 evaluates mark measurement for the positive calculation matrix at step 412 and as described in greater detail below.

If the mark measurement is less than zero at decision point 404, mark detector 13 proceeds to add the current weighted mark value pointed to by the positive evaluation pointer to a positive evaluation accumulator at step 414. Thereafter, mark detector 13 determines if the positive evaluation is less than zero. If no, mark detector 13 proceeds directly to step 420. If yes, mark detector 13 resets the positive evaluation accumulator at step 418. Thereafter, mark detector 13 evaluates mark measurement for the negative calculation matrix at step 420 and as described in greater detail below. Upon completion of step 412 or 420, the method of which is described in FIG. 26 and FIG. 27 respectively, a method for statistical output calculation is complete.

In one implementation of statistical output calculation, the positive evaluation accumulator and negative evaluation accumulator retain their respective values each time when the method is re-run subject to the adjustment from the computation until the accumulators are reset unless otherwise directed by operator instructions. Accordingly, the statistical output calculation is run a number of times before either of the evaluation accumulators are reset due to certainty of detection since the accumulators are reset when the evaluation accumulators fall below zero or after mark 20 has been asserted as is further described herein. In this embodiment, the accumulators are independently reset when they fall below zero, but are simultaneous reset after mark 20 has been asserted. However, other configurations of resetting the accumulators are also contemplated.

Figure 27:
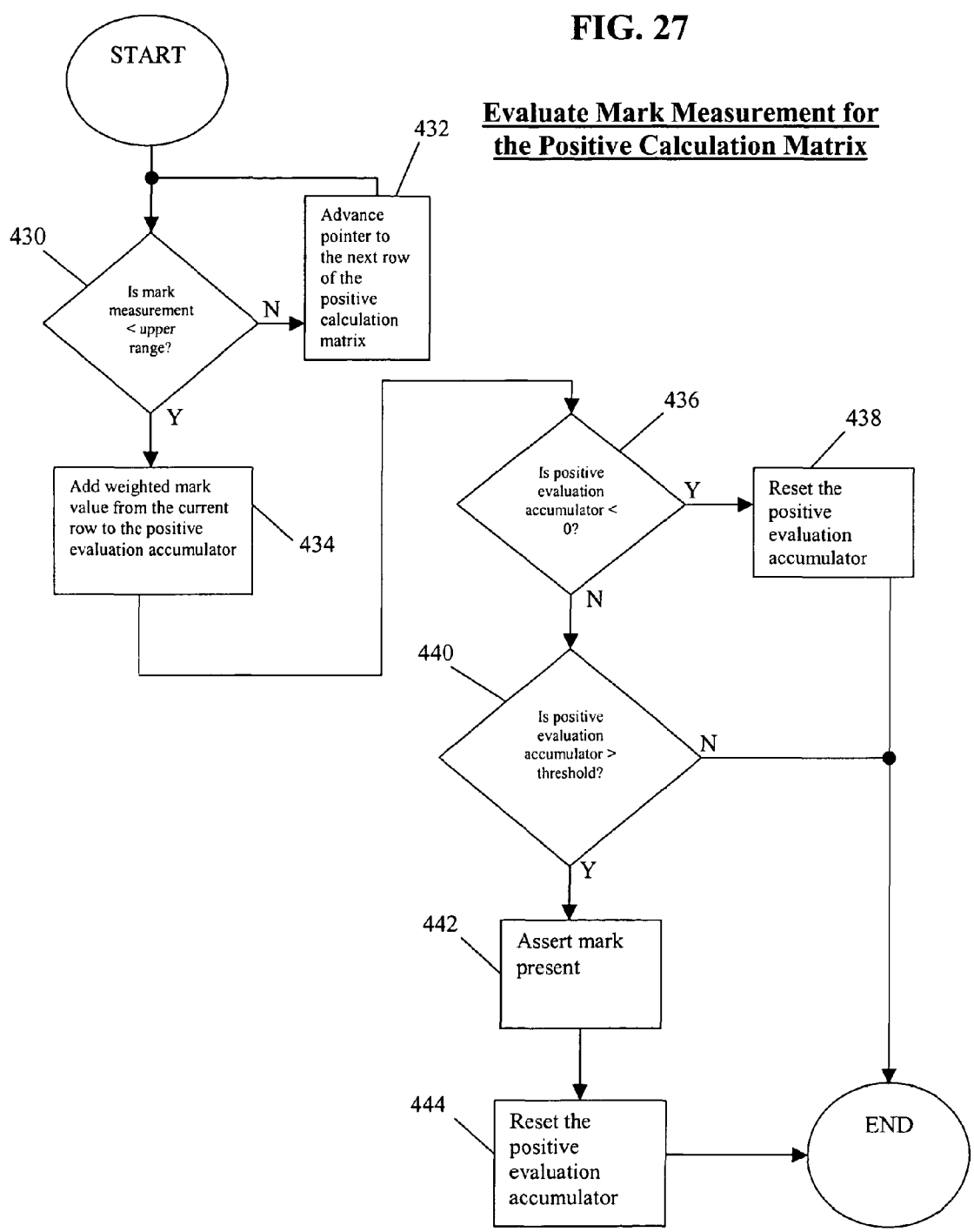
FIG. 27 is a flowchart of a method for evaluating mark measurement for the positive calculation matrix.

Referring to FIG. 27, a method for evaluating mark measurement for the positive calculation matrix is illustrated. In this implementation, the method first includes a decision point 430 wherein mark detector 13 determines whether the mark measurement is less than the current row of upper range column 452. If no, mark detector 13 at step 432 advances the positive evaluation pointer to the next row and returns to decision point 430. If yes, mark detector 13 adds the weighted mark value of row pointed to by the positive evaluation pointer to the positive evaluation accumulator at step 434 and proceeds to decision point 436.

At decision point 436, mark detector 13 determines whether the positive evaluation accumulator is less than zero. If yes, mark detector 13 resets the positive evaluation accumulator at step 438 and completes the method. If no, mark detector 13 proceeds to decision point 440.

Mark detector 13 at decision point 440 determines whether the positive evaluation accumulator is greater than a positive mark presence threshold. If no, the method is complete. If yes, mark detector 13 at step 442 asserts a detection to signaled device 24. Thereafter, mark detector 13 resets the positive evaluation accumulator and a negative evaluation accumulator at step 444 and thereupon completes the method for evaluating the mark measurement for the positive calculation matrix. In one embodiment, the positive mark presence threshold is the same value as the negative mark presence threshold, however different values are contemplated in alternate embodiments.

Figure 28:
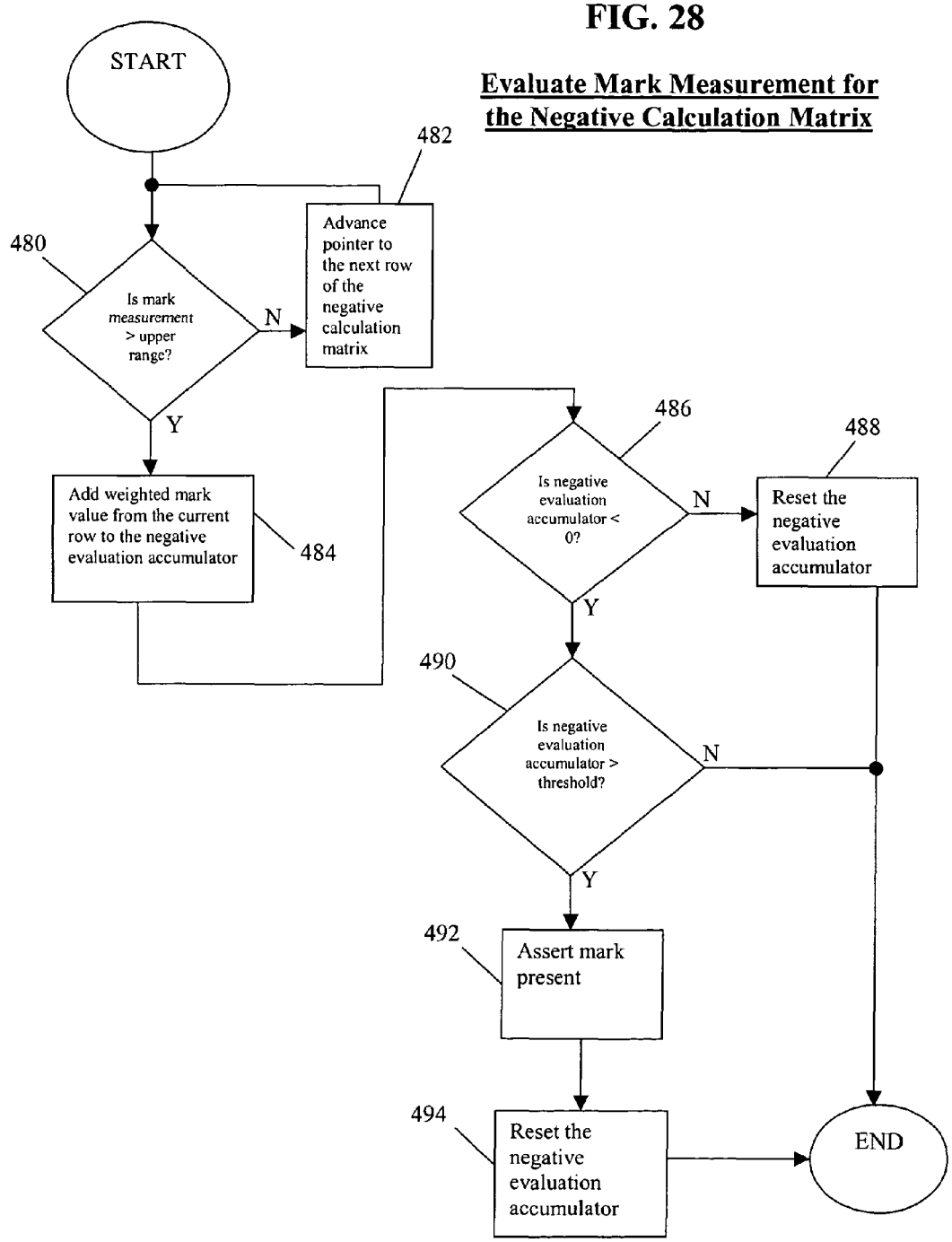
FIG. 28 is a flowchart of a method for evaluating mark measurement for the negative calculation matrix.

Referring to FIG. 28, a method for evaluating mark measurement for the negative calculation matrix is illustrated. In this implementation, the method first includes a decision point 480 wherein mark detector 13 determines whether the mark measurement is greater than the current row of upper range column 452. If no, mark detector 13 at step 432 advances the negative evaluation pointer to the next row and returns to decision point 480. If yes, mark detector 13 adds the weighted mark value of the row pointed to by the negative evaluation pointer to the negative evaluation accumulator at step 484 and proceeds to decision point 486.

At decision point 486, mark detector 13 determines whether the negative evaluation accumulator is less than zero. If yes, mark detector 13 resets the negative evaluation accumulator at step 488 and completes the method. If no, mark detector 13 proceeds to decision point 490.

Mark detector 13 at decision point 490 determines whether the negative evaluation accumulator is greater than a negative mark presence threshold. If no, the method is complete. If yes, mark detector 13 at step 492 asserts a detection to signaled device 24. Thereafter, mark detector 13 resets the positive and negative evaluation accumulators at step 494 and thereupon completes a method for evaluating the mark measurement for the negative calculation matrix.

Figure 29:
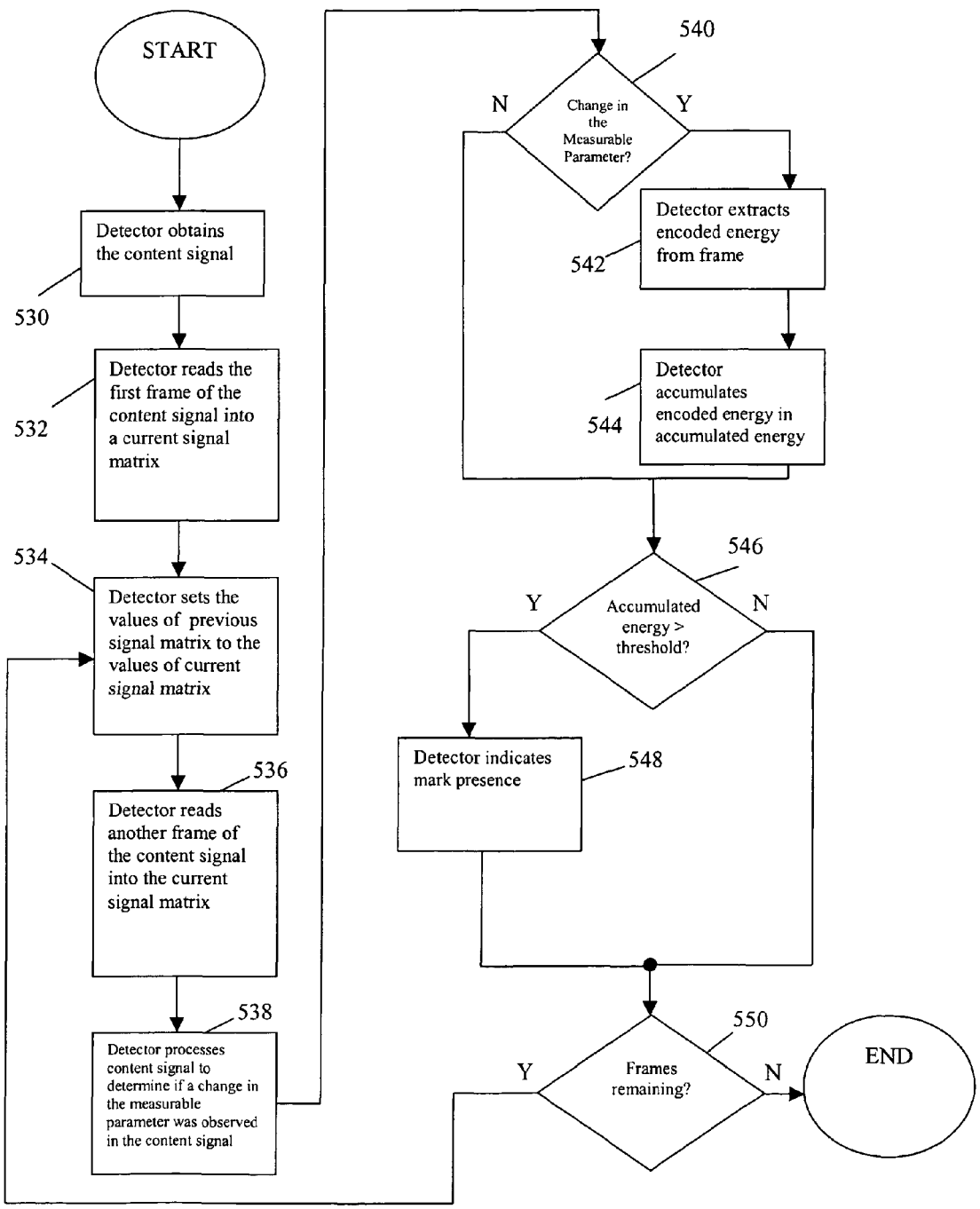
FIG. 29 is a flowchart of an alternate detecting method.

Referring to FIG. 29, an alternate implementation for a method for detecting mark 20 is illustrated. In this implementation, the method first includes mark detector 13 receiving (directly or indirectly) modulated content signal 22 from broadcast source 14 at step 530. Thereafter, mark detector 13 at step 532 reads the first frame of modulated content signal 22 into a current signal matrix. Thereafter, mark detector 13 at step 534 sets the values of a previous signal matrix to the values of the current signal matrix such that the previous signal matrix represents a prior frame of modulated content signal 22 and the current signal matrix represents a current frame of modulated content signal 22.

Mark detector 13 at step 536 reads another frame of modulated content signal 22 into the current signal matrix. Thereafter, mark detector 13 at step 538 processes modulated content signal 22 to determine whether a change in the one or more measurable parameters has been detected within modulated content signal 22.

After analyzing modulated content signal 22 to determine whether a change in the one or more measurable parameters has been detected, mark detector 13 at decision point 540 determines the action that should be taken if such a change. If a change in the one or more measurable parameters has not been observed, mark detector 13 proceeds directly to decision point 546. If a change in the one or more measurable parameters has been observed, mark detector 13 at step 542 calculates the field mark intensity of the current frame of modulated content signal 22. The encoded energy at step 544 is then accumulated in accumulated energy.

Mark detector 13 at decision point 546 determines whether the accumulated energy has exceeded the threshold value. If yes, mark detector 13 at step 548 reports a detection and thereafter resets the accumulated energy.

Mark detector 13 at decision point 550 determines if there is another frame remaining. If yes, mark detector 13 returns to step 534 to process another frame of modulated content signal 22. If no, an alternate implementation for a method of detecting is complete. Other methods of extracting the encoded energy from the frames of modulated content signal 22 such as those described in Broughton are also contemplated.

In another embodiment for the foregoing method, mark detector 13 may output frames of modulated content signal 22 immediately prior to decision point 550.

Figure 30:
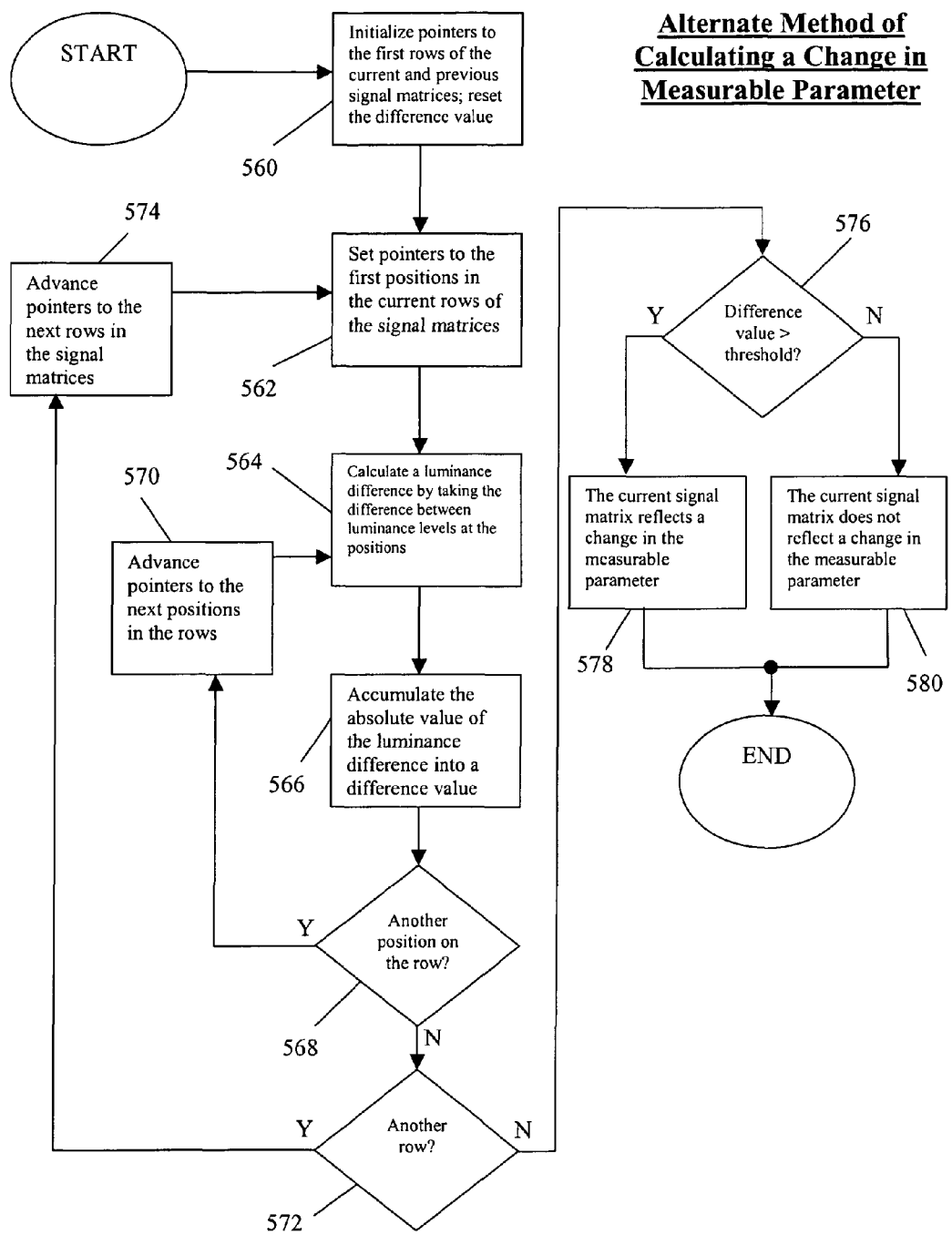
FIG. 30 is a flowchart of an alternate method of calculating a change in measurable parameter for a field.

Referring to FIG. 30, a first alternate implementation of a method for calculating a change in one or more measurable parameters a content signal 18 (or modulated content signal 22) is illustrated. In this implementation, the method includes a device initializing a set of pointers to the first row of the current signal matrix and the previous signal matrix at step 560. Thereafter, the device at step 562 sets the pointers to the first positions in the current rows of the current signal matrix and the previous signal matrix.

The device at step 564 calculates a position difference by taking the difference between the current pointed to positions in the current signal matrix and the previous signal matrix. Thereafter, the device at step 566 accumulates the absolute value of the position difference into a difference value, wherein the difference value represents the sum of differences in luminance levels between corresponding pixels in adjacent frames.

The device determines at decision point 568 whether there is another position in the current rows of the current signal matrix and the previous signal matrix. If yes, the device advances the pointers to the next positions in the rows at step 570 before returning to step 564. If no, the device proceeds to decision point 572.

At decision point 572, the device determines whether there is another row in the current signal matrix and the previous signal matrix. If yes, then device advances the pointers to the next rows in the current signal matrix and the previous signal matrix at step 574 before returning to step 562. If no, the device proceeds to decision point 576.

At decision point 576, the device determines whether the difference value which was accumulated at step 566 exceeds a threshold value indicative of a measurable parameter. If yes, the device at step 578 values the current signal matrix as reflecting a change in a measurable parameter. If no, the device at step 580 values the current signal matrix do not reflect a change in the measurable parameter. Upon completion of step 578 or step 580, an alternate implementation of method for calculating a change in or more measurable parameters is complete. It is also contemplated that the foregoing method may be implemented with a modulation or detection method without use of signal matrices.

Figure 31:
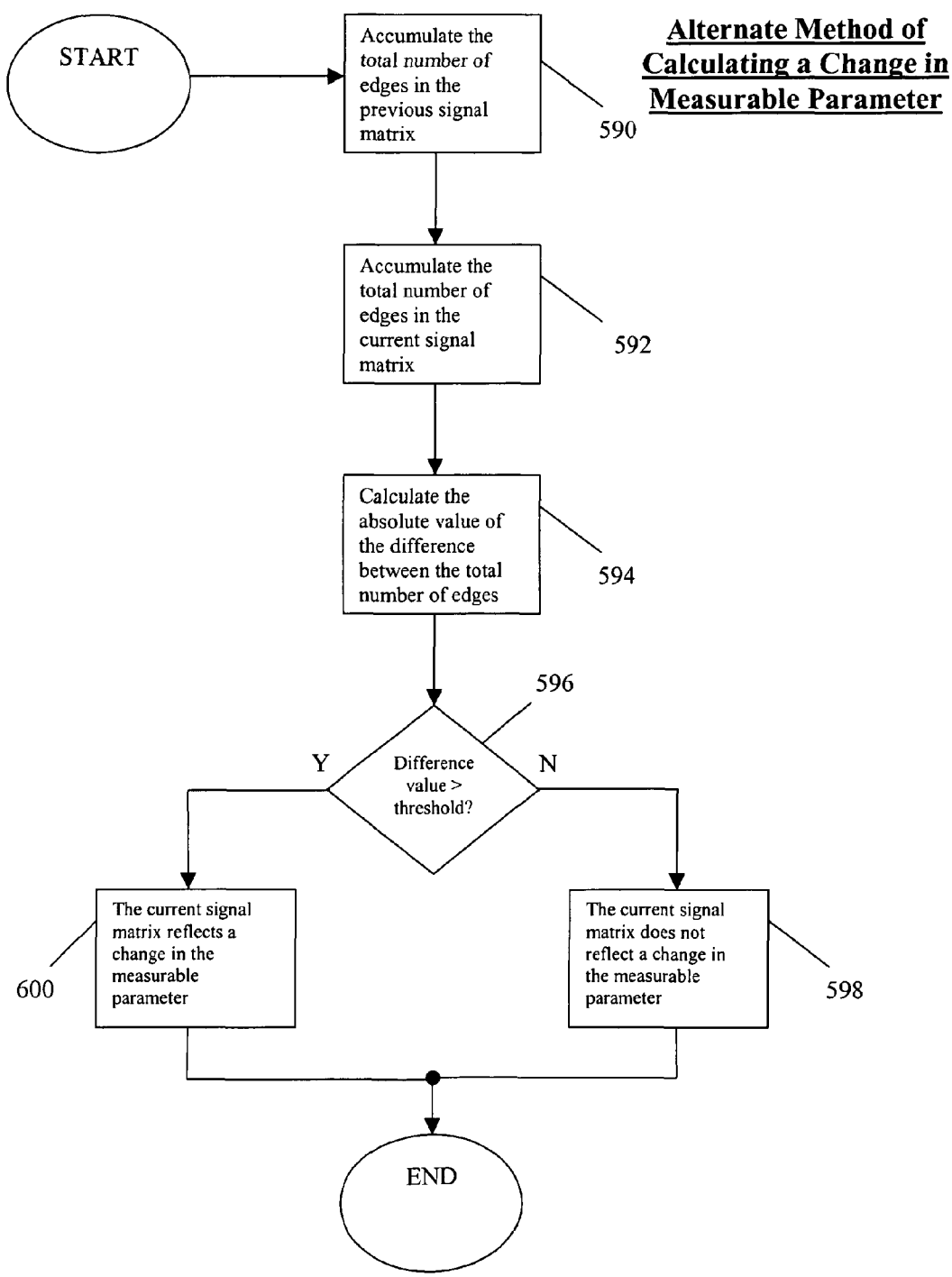
FIG. 31 is a flowchart of a second alternate method of calculating a change in measurable parameter for a field.

Referring to FIG. 31, a further implementation of a method for calculating a change in one or more measurable parameters a content signal 18 (or modulated content signal 22) is illustrated. In this implementation, the method first includes a device that calculates a previous edges value by accumulating the total number of edges in a prior frame (or a previous signal matrix) at step 590, wherein edges in one embodiment reflect a sharp contrast in adjacent pixels in the same frame of content signal 18. In another embodiment, the edges may alternatively be a change in horizontal, vertical or spatial relationship. Thereafter, at step 592, the device calculates a current edges value by accumulating the total number of edges for the current frame (e.g., in the current signal matrix). In another embodiment, a method may alternatively use the average number of edges instead of using the total number of edges.

After accumulation at step 590 and step 592, the device at step 594 calculates a difference value by taking the absolute value of the difference between the previous edges value and the current edges value. Thereafter, the device at decision point 596 determines whether the difference value exceeds a threshold value. If yes, the device at step 600 values the current as reflecting a change in the measurable parameter such that the current frame is a CMP frame. If no, the device at step 598 values the current frame as not having reflected a significant change in the measurable parameter. Upon completion of step 598 or step 600, an alternate method of calculating a change in one or more measurable parameters is complete.

Referring to FIG. 32, an implementation of another alternate method of detecting a change in one or more measurable parameters by use of multiple measurable parameter detection methods is illustrated. In this implementation, the method first includes a device that determines is a change in measurable parameter has occurred at step 610. Thereafter, the device at step 612 retains the results of the identification method as to whether the method determined whether a change in measurable parameter was detected.

The device at decision point 614 determines whether there are additional identification methods for the current frame of content signal 18 (or modulated content signal 22). If yes, the device proceeds to step 616 to advance to the next detection method before returning to step 600. If not, the device proceeds to decision point 618.

At decision point 618, the device determines whether at least half of the methods used to identify a change in measure parameters detected a change in a measurable parameter. If yes, the device at step 620 determines that the results reflect a change in the one or more measurable parameters. If no, the device at step 622 determines that the results do not reflect a change in the one or more measurable parameters. Upon completion of step 620 or step 622, a method of detecting a change in one or more measurable parameters is complete.

Other comparisons at decision point 618 are also contemplated depending on the desired embodiment, such as at least one method must have detected a change in one or more measurable parameters to qualify, or all methods must have detected changes in the measurable parameters to qualify.

Referring to FIG. 33, an implementation of a playback device used to defeat the presence of mark 20 in modulated content signal 22 by monitoring and/or altering modulated content signal 22 is illustrated. In this implementation, playback device 25 includes a content source 31 that provides modulated content signal 22 to a playback processor 61. Content source 31 is in one embodiment a DVD drive with a video DVD located within the DVD drive containing stored modulated content signal 22, but other broadcast sources such as cable and satellite are also contemplated.

Playback processing unit 61 obtains modulated content signal 22 from content source 31 to enable playback device 25 to process modulated content signal 22. Once the processing of modulated content signal 22 is complete, an altered modulated content signal 22 is provided through content output 45 to a recording device, display device 26 or other device. Altered modulated content signal 22 may not be of the same quality as content signal 18 or unaltered modulated signal 22, but may still be watchable by a viewer.

Referring to FIG. 34, a first implementation of a method of circumventing the presence of mark 20 within modulated content signal 22 is illustrated. In this implementation, the method includes a step 630 wherein playback device 25 receives modulated content signal 22 from broadcast source 14 through content source 31. Playback device 25 at step 632 reads the first frame of modulated content signal 22 into a current signal matrix. Thereafter, playback drive 25 at step 634 sets the values of a previous signal matrix to the values of the current signal matrix, such that the previous signal matrix represents a prior frame of modulated content signal 22 and the current signal matrix represents a current frame in modulated content signal 22.

Playback device 25 at step 636 reads another frame of modulated content signal 22 into the current signal matrix. Thereafter, playback device 25 at step 638 processes modulated content signal 22 to determine whether a change in one or more measurable parameters has been detected.

After analyzing modulated content signal 22 to determine whether a change in one or more measurable parameters has been detected, playback device 25 at decision point 640 determines the action that should be taken if a change in the one or more measurable parameters was identified. If a change in one or more measurable parameters was not identified, playback device 25 at step 642 outputs the current frame of modulated content signal 22 and proceeds to decision point 646. If a change in one or more measurable parameters was identified, playback device 25 at step 644 in one embodiment removes the potentially modulated frame(s) (e.g., the CMP frame, one or more selected frames, or a block of frames after the CMP frame) of modulated content signal 22 because of the reflection of a change in one or more measurable parameters. In another embodiment, playback device 25 at step 644 may skip over the potentially modulated frame(s) or replace the potentially modulated frame(s) with a repeated frame. In another embodiment, a single encoded field at step 414 may be removed or replaced instead of an entire frame.

Playback device 25 at decision point 646 determines if there is another frame remaining in modulated content signal 22. If yes, playback device returns to step 634. If no, an implementation of a method of signal circumvention is complete.

Referring to FIG. 35, a second implementation of a method of signal circumvention is illustrated. In this implementation, the method first includes playback device 25 receiving a first frame of modulated content signal 22 from broadcast source 14 by content source 31 at step 650. Thereafter, playback device 25 at step 652 determines whether the current frame of modulated content signal 22 has been modulated. If the frame was not modulated, playback device 25 proceeds from decision point 654 to pass the current frame of modulated content signal 22 through video output 45 at step 658. If the frame was modulated (i.e., a frame of the one or more selected frames), playback device 45 in one embodiment skips transmitting the current frame of modulated content signal 22 at step 656. In another embodiment, playback device 25 may utilize a previous unmodulated frame of modulate video signal 22 or otherwise avoid playing the current frame of modulated content signal 22.

After step 656 or step 658, playback device 25 proceeds to decision point 660 to determine whether is another frame remaining in modulated content signal 22. If yes, playback device 25 at step 662 obtains another frame of modulated content signal 22 and thereafter returns to step 652. If no, a method for circumvention is complete.

In one embodiment, where the foregoing implementations are used as part of a solution to the analog hole, the modulation and detection methods: (i) have a minimal amount of false positives, (ii) are robust, (iii) do not disrupt the content, and (iv) are not overly burdensome or expensive to adapt and include in existing devices.

It should be understood from the foregoing that, while particular implementations have been illustrated and described, various modifications can be made thereto and are contemplated herein. In addition, while this document is described in various embodiments as a partial solution analog hole, various uses of modulation, detection and circumvention with various embodiments are also contemplated. Therefore, it is not intended that the invention be limited by the specific examples provided within the specification.

What is claimed is:

1. A method comprising:
    detecting a first scene change between a first frame and a second frame of a video signal;
    selecting a selected frame in the video signal for encoding based on the scene change that is detected, the selected frame identified as a frame that occurs at least one of a first designated number of frames or a first designated time period following the scene change in the video signal;
    using an encoder, encoding rights-identifying data into the selected frame of the video signal by adding the data to the video signal at the selected frame; and
    determining whether an additional, second scene change occurs within at least one of the first designated number of frames, a second designated number of frames, the first designated time period, or a second designated time period from the scene chance that is identified, wherein encoding the data into the selected frame of the video signal occurs responsive to determining that the additional, second scene change not occurring within the at least one of the first designated number of frames, the second designated number of frames, the first designated time period, or the second designated time period.

2. The method of claim 1, wherein selecting the selected frame in the video signal includes determining whether the first designated time period has expired following the scene change; and
    wherein the selected frame is identified as the frame occurring at expiration of the first designated time period.

3. The method of claim 1, wherein encoding the data into the selected frame comprises:
    encoding the data into an active portion of the selected frame of the video signal.

4. The method of claim 3, wherein encoding the data into the active portion comprises:
    altering an intensity of a plurality of pixels of the active portion of the selected frame.

5. The method of claim 3, wherein encoding the data into the active portion comprises:
    altering a chrominance of a plurality of pixels of the active portion of the selected frame.

6. The method of claim 1, wherein the data is encoded above a noise floor of the video signal.

7. The method of claim 1, wherein the data is a static signal.

8. The method of claim 1, wherein the data indicates that rights are associated with the video signal.

9. The method of claim 1, wherein the selected frame is after the first frame and the second frame in the video signal.

10. The method of claim 1, wherein detecting the first scene change includes identifying a difference between a luminance level of the first frame and a luminance level of the second frame that is greater than one percent.

11. The method of claim 1, further comprising:
    detecting a second scene change between a third frame and a fourth frame of the video signal; and
    encoding the data into a fifth frame of the video signal based on detecting the second scene change.

12. The method of claim 1, wherein the data is a non-steganographic signal that is encoded into the video signal.

13. The method of claim 1, wherein the data is a non-steganographic signal that is encoded into the video signal above a noise floor of the video signal.

14. The method of claim 1, wherein, prior to adding the rights-identifying data to the video signal, the video signal is a first video signal, and wherein adding the rights-identifying data to the first video signal creates a modulated video signal that includes additional data relative to the first video signal due to addition of the rights-identifying data to the first video signal.

15. A method comprising:
    detecting a first scene change between a first frame and a second frame of a video signal;
    selecting a selected frame in the video signal for encoding based on the scene change that is detected, the selected frame identified as a frame that occurs at least one of a first designated number of frames or a first designated time period following the scene change in the video signal;
    using an encoder, encoding rights-identifying data into the selected frame of the video signal by adding the data to the video signal at the selected frame;
    detecting a second scene change between a third frame and a fourth frame of the video signal; and
    encoding the data into a fifth frame of the video signal based on detecting the second scene change.

* * * * *